US011055232B2

United States Patent
Keppel et al.

(10) Patent No.: US 11,055,232 B2
(45) Date of Patent: Jul. 6, 2021

(54) VALID BITS OF A TRANSLATION LOOKASIDE BUFFER (TLB) FOR CHECKING MULTIPLE PAGE SIZES IN ONE PROBE CYCLE AND RECONFIGURABLE SUB-TLBS

(71) Applicant: Intel Corporation, Santa Clara, CA (US)

(72) Inventors: David Pardo Keppel, Mountain View, CA (US); Binh Pham, Burlingame, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/370,848

(22) Filed: Mar. 29, 2019

(65) Prior Publication Data

US 2019/0227947 A1  Jul. 25, 2019

(51) Int. Cl.
*G06F 12/1036* (2016.01)
*G06F 12/1045* (2016.01)
*G06F 12/1009* (2016.01)

(52) U.S. Cl.
CPC ...... *G06F 12/1036* (2013.01); *G06F 12/1009* (2013.01); *G06F 12/1045* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 5,907,867 A | * | 5/1999 | Shinbo | G06F 12/1027 711/207 |
| 6,112,285 A | * | 8/2000 | Ganapathy | G06F 12/1027 711/203 |
| 6,205,531 B1 | * | 3/2001 | Hussain | G06F 12/1036 345/564 |
| 6,233,652 B1 | * | 5/2001 | Mathews | G06F 12/1027 365/202 |
| 6,625,715 B1 | * | 9/2003 | Mathews | G06F 12/1027 711/205 |

(Continued)

OTHER PUBLICATIONS

"Zen—Microarchitectures—AMD". Retrieved from: https://en.wikichip.org/wiki/amd/microarchitectures/zen on Mar. 27, 2019, 31 pages.

(Continued)

*Primary Examiner* — Charles Rones
*Assistant Examiner* — Ryan Dare
(74) *Attorney, Agent, or Firm* — Nicholson De Vos Webster & Elliott LLP

(57) ABSTRACT

A processor includes a translation lookaside buffer (TLB) to store a TLB entry, wherein the TLB entry comprises a first set of valid bits to identify if the first TLB entry corresponds to a virtual address from a memory access request, wherein the valid bits are set based on a first page size associated with the TLB entry from a first set of different page sizes assigned to a first probe group; and a control circuit to probe the TLB for each page size of the first set of different page sizes assigned to the first probe group in a single probe cycle to determine if the TLB entry corresponds to the virtual address from the memory access request.

20 Claims, 14 Drawing Sheets

(56) References Cited

U.S. PATENT DOCUMENTS

| | | | |
|---|---|---|---|
| 6,715,057 B1* | 3/2004 | Kessler | G06F 12/1009 711/207 |
| 2004/0054867 A1 | 3/2004 | Stravers et al. | |
| 2005/0038973 A1* | 2/2005 | Ito | G06F 12/1027 711/207 |
| 2011/0276778 A1* | 11/2011 | Dooley | G06F 12/1027 711/207 |
| 2014/0189192 A1* | 7/2014 | Raikin | G06F 12/1027 711/3 |
| 2018/0203806 A1 | 7/2018 | Hoane et al. | |
| 2018/0232316 A1 | 8/2018 | Mirza et al. | |
| 2020/0183856 A1* | 6/2020 | Campbell | G06F 12/1036 |

OTHER PUBLICATIONS

I. Cutress, "The AMD Zen and Ryzen 7 Review: A Deep Dive on 1800X, 1700X and 1700". Anandtech, Mar. 2, 2017. [Retrieved from: https://www.anandtech.com/show/11170/the-amdzen-and-ryzen-7-review-a-deep-dive-on-1800x-1700x-and-1700/10, on Mar. 27, 2019] 4 pages.

B. Pham, V. Vaidyanathan, A. Jaleel, A. Bhattacharjee. "CoLT: Coalesced Large-Reach TLBs". Proceedings of IEEE Micro-45. Dec. 2012. pp. 258-269. DOI:10.1109/MICRO.2012.32.

B. Pham, A. Bhattacharjee, Y. Eckert, G. Loh. "Increasing TLB Reach by Exploiting Clustering in Page Translations". Proceedings of the 20th International Symposium on High Performance Computer Architecture. Feb. 2014; DOI:10.1109/HPCA.2014.6835964, abstract, 1 page.

Stephen Junkins, "The Computer Architecture of Intel® Processor Grahics Gen9". Intel internal presentation, 2015, <https://software.intel.com/sites/default/files/managed/c5/9a/The-Compute-Architecture-of-Intel-Processor-Graphics-Gen9-v1d0.pdf> 22 pages.

Cray Incorporated. "XC™ Series Programming Environment User Guide", section 7.3 "Hugepages". Document No. S-2529, not dated. https://pubs.cray.com/pdfattachments/attachment?publd=00463350-DA&attachmentId=pub_00463350-DA.pdf as of Oct. 2018; pp. 49-51.

Cray Incorporated. "XC Series Programming Environment User Guide (17.05) S-2529," Mar. 22, 2016. <https://pubs.cray.com/content/S-2529/17.05/xctm-series-programming-environment-user-guide-1705-s-2529/hugepages> 77 pages.

Cray Incorporated. "Using Chapel on Cray System; Special Notes for Cray XC, XE, and XK Series Systems", 2018. https://chapel-lang.org/docs/platforms/cray.html#special-notes-for-crayxc-xe-and-xk-series-systems as of Oct. 2018, 1 page.

Talluri, Hill. "Surpassing the TLB Performance of Superpages with Less Operating System Support". ASPLOS 1994, 14 pages.

I. Wienand, "Transparent Large-Page Support for Itanium Linux". Master's Thesis. University of New South Wales. Jul. 2008.

European Search Report and Search Opinion, EP App. No. 20155817.8, dated Sep. 3, 2020, 7 pages.

* cited by examiner

FIG. 4
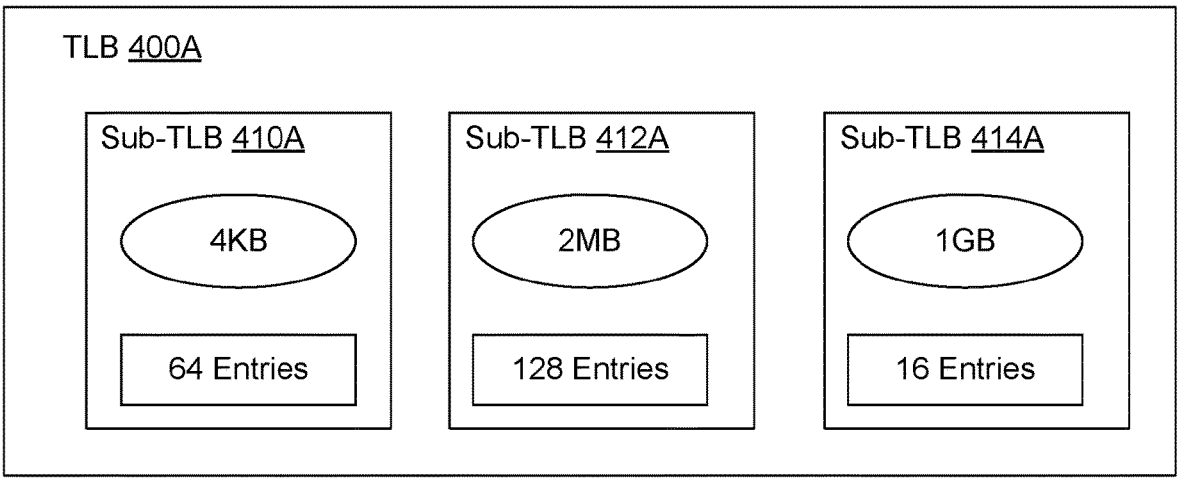
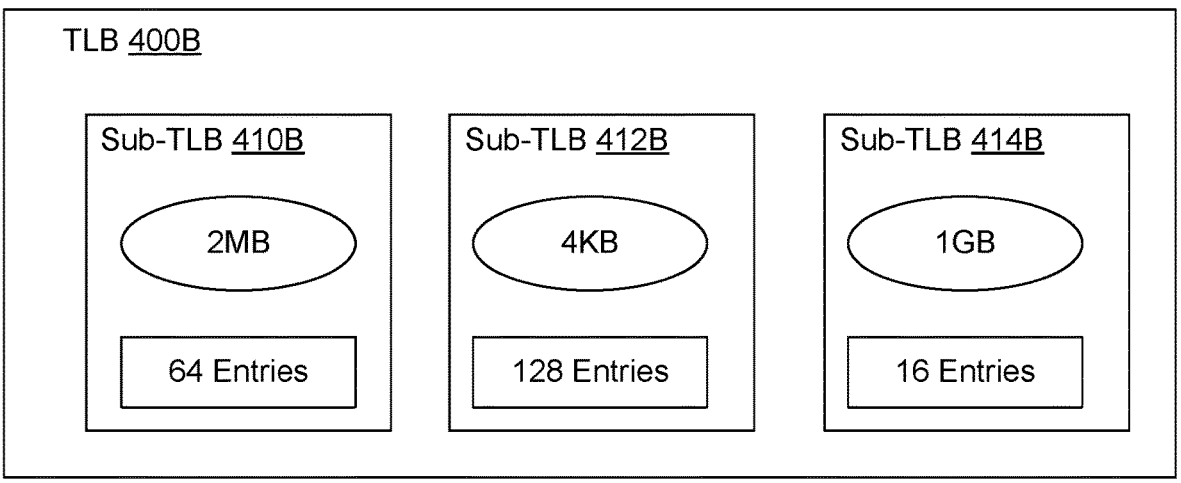
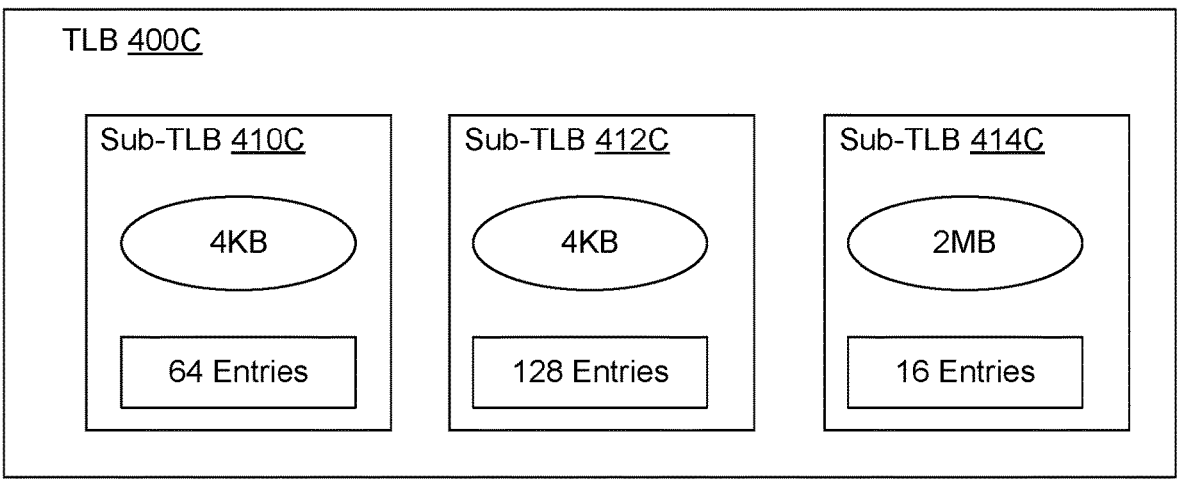

VALID BITS OF A TRANSLATION LOOKASIDE BUFFER (TLB) FOR CHECKING MULTIPLE PAGE SIZES IN ONE PROBE CYCLE AND RECONFIGURABLE SUB-TLBS

STATEMENT REGARDING FEDERALLY SPONSORED RESEARCH AND DEVELOPMENT

This invention was made with Government support under contract number H98230A-13-D-0124-08 awarded by the Department of Defense. The Government has certain rights in this invention.

TECHNICAL FIELD

The present disclosure pertains to computer systems; more specifically, translation lookaside buffers supporting multiple page sizes and coalescing.

BACKGROUND

Computer systems map virtual addresses used by applications to physical addresses stored in memory. An operating system (OS) configures the mappings and stores them in a page table. When an application accesses memory, the virtual address used by the application must be mapped to the physical address in memory. The operating system may then search the page table, referred to as a page walk to retrieve the mapping. However, a translation lookaside buffer (TLB) may be a cache located near the processing core, or CPU, which may store a subset of the mappings of the page table for quick access by the CPU. A TLB can significantly reduce the time required to retrieve virtual to physical mappings.

BRIEF DESCRIPTION OF THE DRAWINGS

FIG. 4 is a block diagram illustrating example sub-TLB configurations for a TLB with reconfigurable sub-TLBs.

DETAILED DESCRIPTION

Figure 1:
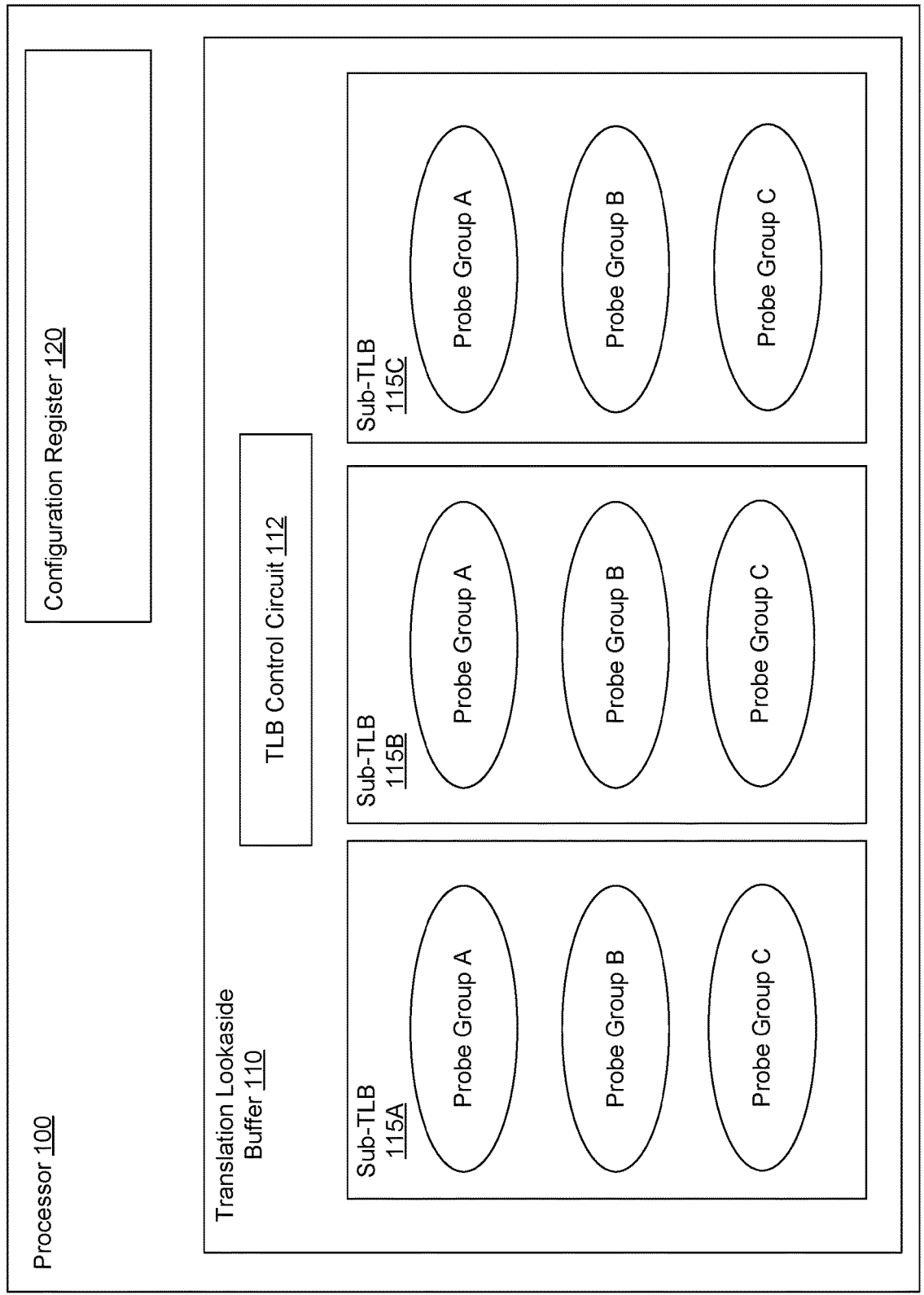
FIG. 1 is a system block diagram illustrating a processor with a TLB comprising sub-TLBs which may be reconfigurable and which may probe for multiple page sizes in one probe cycle according to one implementation.

TLBs can be highly useful in reducing system latency due to lengthy page walks. However, because the TLB is a cache it may store only a small subset of the mappings defined in the page tables. When an application reads or writes ("touches") more pages than the capacity of the TLB then there may be TLB misses (i.e. the page mapping is not cached in the TLB). Upon a TLB miss, a TLB entry may be evicted and replaced with a mapping retrieved from a page walk. A later reference may then need to re-fetch the evicted entry from a page walk. However, page walks may be very slow in comparison to retrieving TLB mappings so if an application's use of memory leads to a high TLB miss rate then the TLB miss costs may significantly impact system performance. Thus, a TLB design that supports a wide range of application memory access patterns and also delivers a low TLB miss rate is desirable.

Systems using virtual paging may use a single page size. However, a single page size may be limiting because larger pages may reduce TLB miss rates but increase granularity of permissions and page allocation while smaller pages may reduce granularity but cause a higher TLB miss rate. Alternatively, a system may use multiple page sizes which may allow smaller pages to be allocated for memory regions that need fine-grained control and larger pages to be allocated to other regions, reducing the number of TLB entries required. Offering a larger number of page sizes may provide for more efficient mapping. For example, if only 4 KB and 2 MB pages are available for a 1 MB allocation then using a 2 MB mapping wastes 1 MB of memory but would require 250×4 KB pages. However, if more page sizes are offered then page size allocation may be made more efficient, reducing wasted memory and reducing the required number of TLB entries.

On the other hand, probing a TLB supporting a large number of page sizes may reduce system performance. One approach may include probing a set-associative TLB using a hash function for each page size. For example, the TLB may select a first page size and probe the TLB entries using the hash for that page size, and if a match isn't found then the TLB may select a second page size and probe the TLB entries using the hash function for that page size, and so forth. This "re-probing" approach may reduce system performance because additional time is required for each re-probe.

One approach to support multiple page sizes may include a TLB with several sub-TLBs that each holds a different page size. The TLB may use different virtual address bits to index each sub-TLB. For example, a TLB supporting page sizes 4 KB, 2 MB, and 1 GB may use three sub-TLBs: one sub-TLB holds 4 KB entries and hashes bits 13 and up of the virtual address (VA), one sub-TLB holds 2 MB entries and hashes bits 22 and up of the VA, and one sub-TLB holds 1 GB entries and hashes bits 31 and up to of the VA to compute the index. However, if an application's use of page sizes is a poor match to the number of entries provided by the number of entries in the sub-TLBs then a high TLB miss rate may result. For example, an application may use mainly one page size in which case the sub-TLBs that do not hold that page size may sit idle even if there is a high miss rate for the one page size.

Another approach to build a TLB with a small number of entries that can map more pages than the number of TLB entries may comprise "coalescing" adjacent pages into a single TLB entry. Coalescing may map a contiguous block of virtual addresses to a contiguous block of physical addresses in one TLB entry. Implementation of coalescing, e.g. for a 4 KB page, may comprise, upon a TLB hit, adding the bits [13:12] of the VA to a physical page number (PPN) from a TLB entry to form the physical address of the appropriate page mapped by the TLB entry. Where the coalesced pages span a physical page group (the size of the TLB entry) then a carry out may be calculated by adding the [13:12] bits of the VA and the [13:12] bits of the PPN and then adding the result to bit 14 and above of the PPN. Adding bits [13:12] to of the VA and the PPN may correspond to coalescing to a degree of four, i.e. coalescing four pages. Other degrees of coalescing may be used and therefore a different number of bits of the VA and PPN may be added to calculate the physical address. Furthermore, different bits may be used for different page sizes (e.g., higher bits for larger page sizes). However, the carry operation may take a large number of clock cycles and therefore may negatively impact system performance.

Embodiments described herein may address the above deficiencies. TLB entries may include multiple valid bits that may be used to probe multiple page sizes in one probe cycle. Furthermore, a TLB may include reconfigurable sub-TLBs which may be dynamically configured to address specified workloads or processes. Additionally, a TLB may provide for coalescing using a "narrow-adder" to remove the additional time required for an operation to propagate a carry when generating a physical address. A TLB with a narrow-adder may coalesce pages as long as the carry-out from a narrow add operation is dropped. A TLB may comprise any combination of multiple valid bits, reconfigurable sub-TLBs, and coalescing with a narrow-adder.

In one embodiment, a TLB utilizing multiple valid bits to probe multiple page sizes in one probe cycle may include one or more TLB implementation sizes, or "probe groups," each comprising multiple page sizes (i.e. multiple page sizes within each probe group). The multiple valid bits may be used to probe the TLB for each of the page sizes within a probe group in a single probe cycle. For example, to support six page sizes a TLB may include two probe groups each comprising three page sizes. In one probe cycle a first probe group may be used to probe the TLB entries for each of the three page sizes of the first probe group in that probe cycle. The TLB may set the largest page size of a group as the index used to probe for page sizes within the group. If there is not a match, then the TLB may be re-probed using the second probe group to probe the TLB for each of the three page sizes within the second probe group. Thus, in this example six page sizes may be probed in two probe cycles.

In one example, four valid bits may be used to determine a page size within a probe group consisting of 4 KB, 8 KB and 16 KB page sizes. If only one valid bit is set in a TLB entry then the entry contains a mapping for a 4 KB page. If a single 8 KB page is mapped, then two valid bits are set. This may also occur if two 4 KB pages are coalesced. If a 16 KB page is mapped, then four valid bits are set. This may also occur when several smaller pages are coalesced, such as two 8 KB pages, an 8 KB page and two 4 KB pages, or four 4 KB pages.

In one embodiment, a TLB may utilize multiple sub-TLBs which may be configurable to support a range of page sizes depending on the configuration settings. For example, each sub-TLB may be configured and reconfigured to store entries for one page size of a plurality of supported page sizes. A sub-TLB may be able to store multiple page sizes but at any given time may be configured to support only one of those page sizes or a combination of the page sizes.

A TLB or sub-TLB may be configured or reconfigured in a number of ways. Post-manufacturing fuses may be set to provide a configuration for a TLB allowing different TLB configurations for the same chip design. Alternatively, the TLB may be configured at boot-time, such as by the BIOS, which may be advantageous for computers that are used to run a specific class of workloads. The TLB may be configured by an application, which may allow the application to execute on a legacy operating system but still take advantage of the reconfigurable TLB hardware. A hardware agent may monitor TLB usage and/or behavior to deduce an appropriate configuration and automatically adjust the configuration. Finally, the TLB may be configured by the OS based on usage patterns or even on a per process basis. Therefore, the TLB may be adapted in real time to reduce the TLB miss rate according to the process executing at that time. Two or more of the above approaches may be combined.

In one embodiment, the TLB may use multiple valid bits to coalesce adjacent pages in virtual and physical memory into a single TLB entry. However, pages may only coalesce if they are in the same physical coalescing group (i.e. in the same group in physical memory). The TLB may not coalesce across groups and therefore may avoid ever having to perform a carry operation when generating the physical address from the TLB entry. This may be referred to as a narrow-adder. Adjacent pages that could be coalesced across groups using traditional coalescing may not be coalesced. Rather, another TLB entry is created for pages in a different physical coalescing group which may marginally reduce TLB capacity while significantly improving system performance.

Therefore, the present disclosure provides for a TLB that can support more page sizes and reduce TLB miss rates with minimal overhead costs with respect to physical size and power usage. The use of reconfigurable sub-TLBs may provide additional flexibility in allocation of TLB entries for different page sizes, and in combination with multiple valid bits may provide support for a large number of page sizes. The multiple valid bits may also provide for coalescing within TLB entries while a narrow adder removes the overhead of carry propagation associated with traditional coalescing.

FIG. 1 is a block diagram of an example processor 100 comprising a TLB 110 and a configuration register 120. The TLB 110 may comprise one or more sub-TLBs 115A-C for storing TLB entries. Each TLB entry may map a virtual address of a page of memory to the physical address of the page of memory. Each of the sub-TLBs may support a plurality of probe groups. Each probe group may comprise a plurality of page sizes. For example, each sub-TLB 115A-C may support three probe groups A-C. Configuration register 120 may comprise a setting for each sub-TLB to store entries for one or more of the probe groups A-C. The configuration register 120 may be used to reconfigure the probe groups, and thus the page sizes, supported by each sub-TLB.

In one example, configuration register 120 may comprise a first setting for sub-TLB 115A, a second setting for sub-TLB 115B, and a third setting for sub-TLB 115C. The first setting may configure sub-TLB 115A to store TLB entries for page sizes included in probe group A. The second setting may configure sub-TLB 115B to store TLB entries for page sizes included in probe group B. The third setting may configure sub-TLB 115C to store TLB entries for page sizes included in probe group C. Each probe group may comprise a plurality of page sizes. For example, probe group A may comprise entries for 4 KB, 8 KB and 16 KB pages, probe group B may comprise entries for 64 KB, 128 KB, and 256 KB pages, and probe group C may comprise entries for 1 MB, 2 MB, and 4 MB pages. The probe groups may include any number of page sizes.

To support multiple page sizes within a probe group, TLB entries may comprise multiple valid bits that allow for tag matches for several page sizes in a single probe. In one example, probing the TLB utilizing multiple valid bits may comprise selecting a probe group and using the hash function for the largest page size of the probe group to select a set of TLB entries. A virtual page number of the virtual address may be compared with a virtual tag for the largest page size of the group, or any other representative page size of the probe group. A single valid bit of the multiple valid bits of a TLB entry may be used for a valid bit comparison. The valid bit to check may be selected based on particular bits of the virtual address, referred to as the valid bit number (VBN). The number of the particular bits used to select the valid bit to check may be dependent upon the degree of coalescing. For example, when $2^L$-way coalescing is used to build probe groups, then the valid bit to check may be selected based on L bits of the virtual address. Finally, the probe group may be compared to a size tag of the TLB entry, which may indicate which probe group the entry belongs to. If the VPN matches the virtual tag, the selected valid bit is set as valid, and the probe group matches the size tag then the entry matches, otherwise it does not match. If none of the entries of the set are matched then the next probe group may be selected and the process repeats until there is a match or until there are no probe groups left to probe.

In the same or different example, if there is a match (i.e. the VPN matches virtual tag, the selected valid bit is set, and the probe group matches the size tag) then the physical address may be generated. The physical address may be generated by adding the VBN to the PPN and then concatenating the result with the offset from the virtual address, as with traditional coalescing. Alternatively, the generation of the physical address may be implemented with a narrow adder. Generating the physical address with a narrow adder may include first adding the VBN to the lowest bits of the PPN modulo four. Then the higher bits of the PPN may be concatenated with the result of the add/modulo operation and the offset from the virtual address. Therefore, a carry out operation may be avoided when using a narrow adder for coalescing.

Figure 2A:
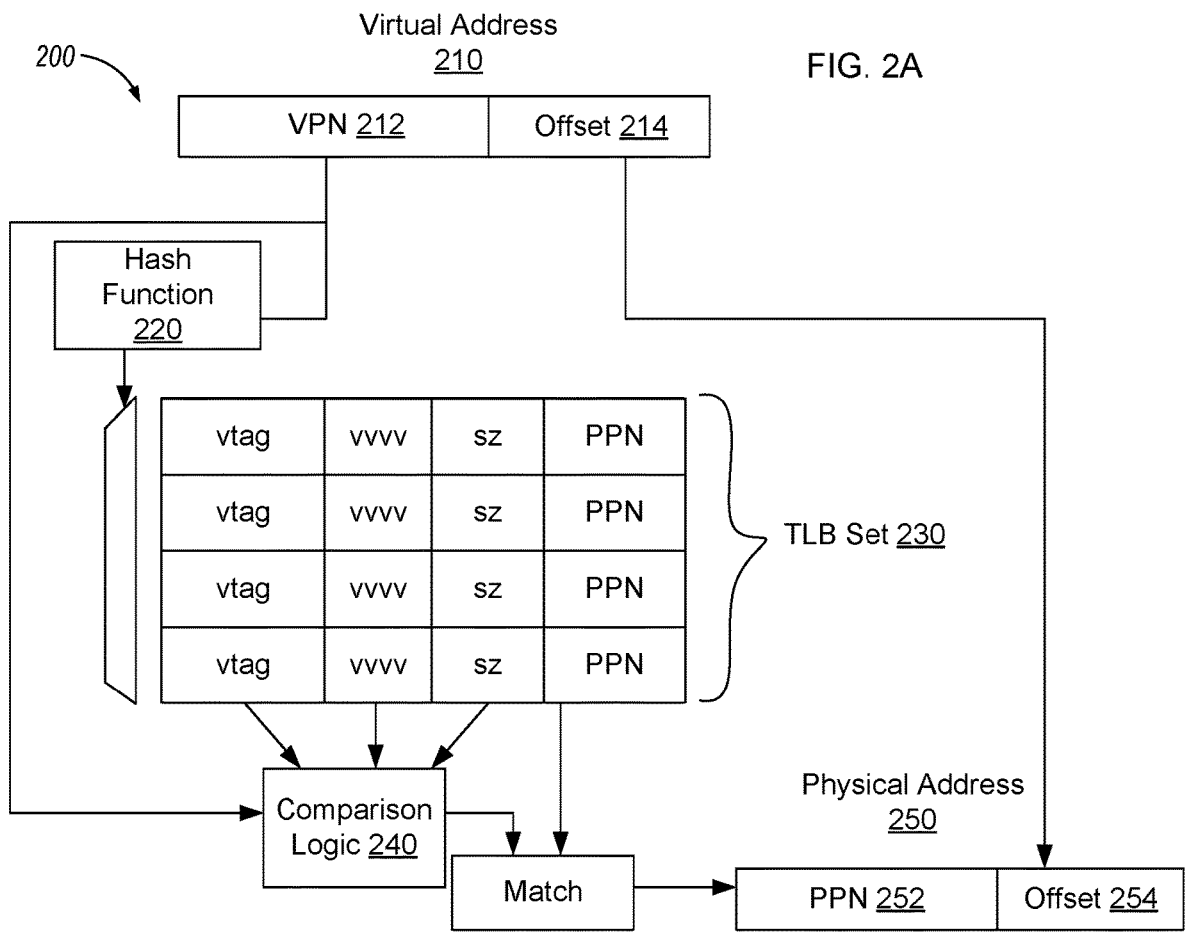
FIG. 2A is a block diagram illustrating a TLB control circuit using multiple valid bits to probe for multiple page sizes in a single probe cycle according to one implementation.

FIG. 2A is a block diagram illustrating a TLB control circuit 200. TLB control circuit 200 may be the same or similar to the TLB control circuit 112 of FIG. 1. TLB control circuit 200 may receive a virtual address 210 from a memory access request. A hash function 220 may be applied to the virtual page number (VPN) of the virtual address 210 to determine a set of TLB entries 230 to be probed. The hash function 220 may be associated with a probe group selected to be probed in a current probe cycle. For example, the probe group may comprise 4 KB, 8 KB, and 16 KB page sizes and the hash function 220 may be associated with a single page size within the probe group (e.g. 16 KB hash function). The hash function 220 may hash for each page size within the selected probe group.

After the set of TLB entries 230 are selected using the hash function associated with the probe group, the comparison logic 240 of the TLB may probe the set of TLB entries to determine if a TLB entry of the set corresponds to the virtual address 210. To determine if the TLB entry corresponds to the virtual address 210, the comparison logic 240 may determine if the VPN 212 matches a virtual tag ("vtag") of one of the hashed TLB entries. If the VPN 212 does not match the vtag then the TLB entry does not match the virtual address and the logic may move on to determining if the VPN 212 matches the vtag of another TLB entry. If the VPN 212 matches the vtag, the logic may determine if one of the valid bits of the TLB entry is set as valid. Which bit of the multiple valid bits to check may be determined by a value derived from the VPN 212. For example, bits [13:12] of the virtual address 210 (the low bits of the VPN 212) may provide a value corresponding to one valid bit to check from multiple valid bits of the TLB entry. If the corresponding valid bit is not set as valid then there is not a match. If the bit is set as valid then there may be a match if a size tag of the TLB entry, which indicates a probe group, also corresponds to the selected probe group.

If a TLB entry is matched then a physical address may be generated using the physical page number (PPN) retrieved from the matched TLB entry and the offset 214 from the virtual address 210. The bits of the virtual address 210 that comprise the offset 214 used to generate the physical address may depend on the size of the page being mapped by the TLB entry. For example, with a probe group of 4 KB, 8 KB, and 16 KB page sizes, if the page size is 4 KB, the [11:0] bits of the virtual address may be used as the virtual offset, [12:0] for 8 KB pages, and [13:0] for 16 KB pages. If there was no TLB entry matched then a page table entry may be retrieved to create a new TLB entry. Creation of a new TLB entry is described in more detail below with respect to FIG. 3A and FIG. 3B.

Figure 2B:
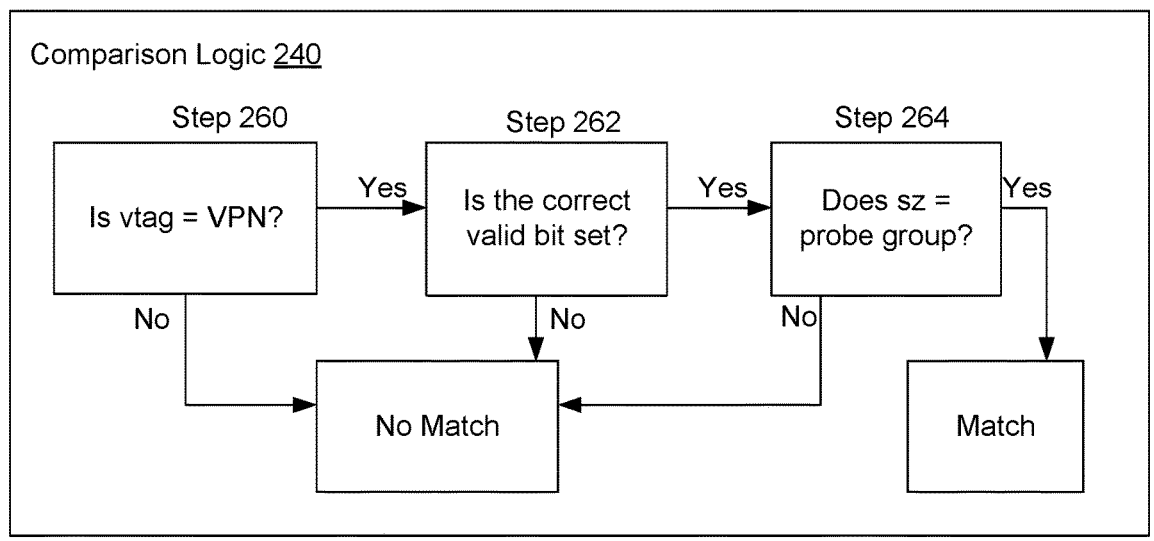
FIG. 2B is a block diagram illustrating example TLB comparison logic for probing a TLB entry using multiple valid bits according to one implementation.

FIG. 2B is a block diagram illustrating comparison logic 240 of FIG. 2A. The comparison logic may determine if a TLB entry of the set of TLB entries 230 corresponds to the virtual address 210. Comparison logic 240 may comprise three steps in determining whether a TLB entry matches the virtual address 210. At step 260, it may be determined whether the VPN 212 from the virtual address matches a vtag of the TLB entry. In probing multiple page sizes using a probe group, the vtag may match the VPN 212 for all page sizes within the probe group. For example, the vtag may match the VPN 212 if the vtag matches the VPN 212 for the largest page size of the current probe group, whether or not the entry corresponds to a different page size in the probe group. However, if the vtag does not match the VPN then the entry does not match the virtual address.

Next, at step 262 it may be determined if a valid bit of a plurality of valid bits of the TLB entry is set. In one example, the TLB entry may include four valid bits. The VPN 212 from the virtual address 210 may include one or more bits that indicate which valid bit to check. In this case because there are four valid bits then two bits would be necessary to determine which valid bit to check. The two bits, or whatever number of bits used to select a valid bit to check, may be referred to as a valid bit number (VBN). For example, if neither of the bits of the VBN is set then a first valid bit may be checked. If a lower bit is set while a higher bit is not set then a second valid bit may be checked. If a higher bit is set while the lower bit is not set then a third bit may be set. If both bits are set then a fourth bit may be checked. If the bit selected by the VBN is not set as valid then there is not a match. If the bit corresponding to the VBN is set as valid then the comparison moves to step 264. At step 264, it may be determined if a size tag of the TLB entry matches the probe group. For example, if there are two probe groups then the size tag may be a single bit. Thus, the size tag bit set as 1 may indicate a first probe group and the size tag bit set as 0 may indicate a second probe group. Alternatively, the size tag may be a value rather than a bit or combination of bits.

Therefore, it may be determined if there is a TLB entry that matches the virtual address. The VPN 212 which may be the same for all page sizes in a probe group may match the vtag of the TLB entry indicating that a particular VPN 212 mapping is stored in the TLB entry. When the size bit matches, it may indicate that the VPN 212 mapping is in the proper probe group. Finally, the correct valid bit being set as valid indicates that the VPN mapping is valid and corresponds to the proper page size within the probe group.

Figure 3B:
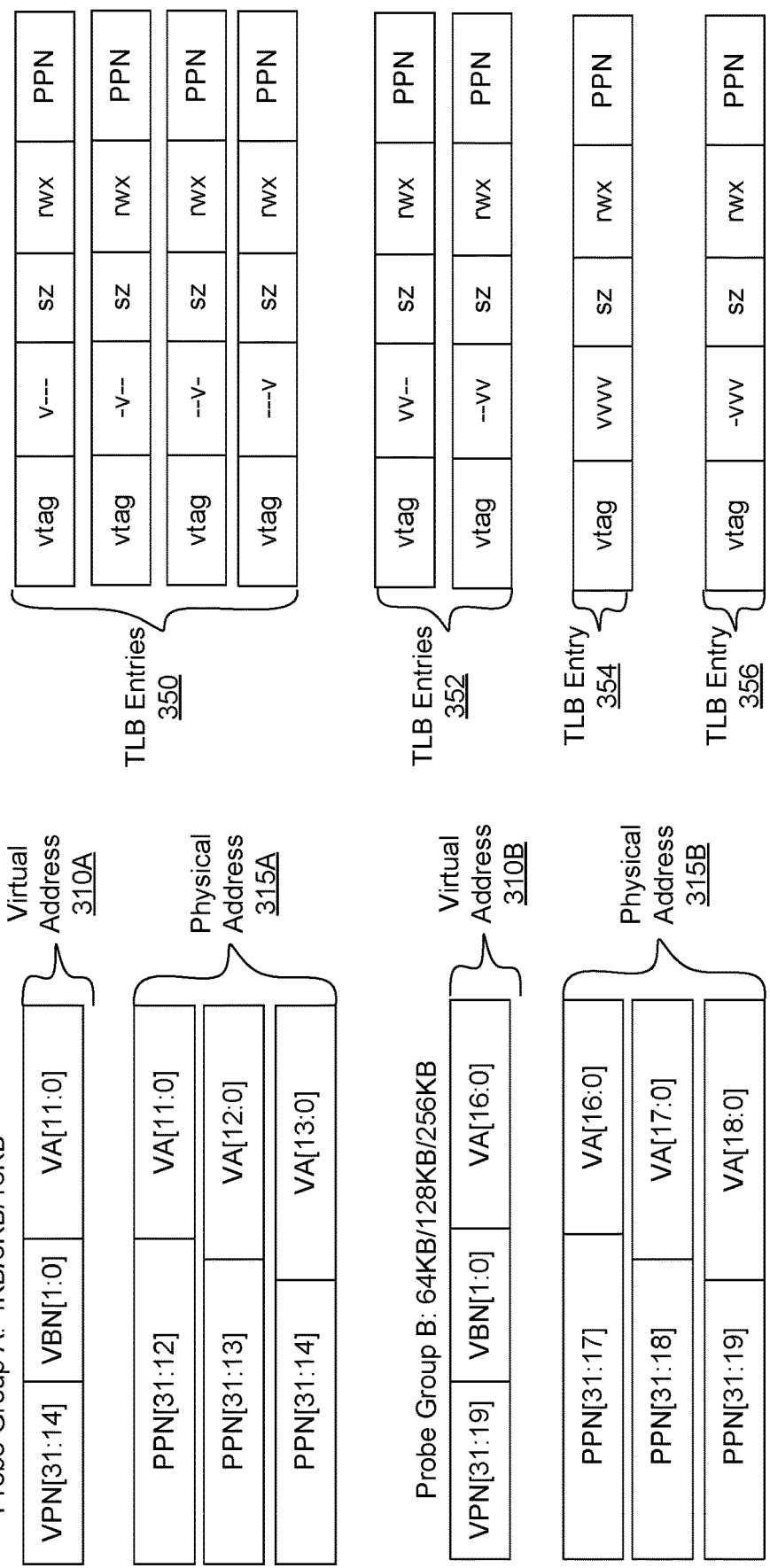
FIG. 3B is a block diagram illustrating example TLB entries comprising a set of valid bits identifying different page sizes of a probe group according to one implementation.
Figure 3A:
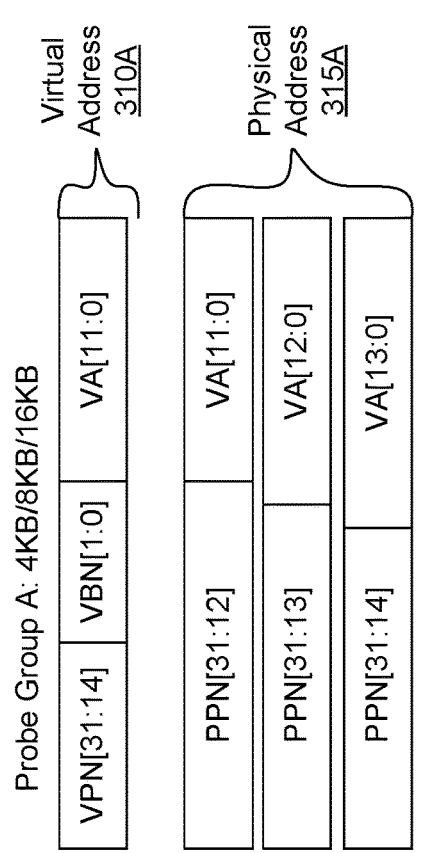
FIG. 3A is a block diagram illustrating example virtual addresses and the corresponding physical addresses generated from the virtual addresses for multiple probe groups and page sizes according to one implementation.

FIG. 3A is a block representation of physical addresses 315A-B generated when a virtual address 310A-B is matched to a TLB entry as in FIG. 2B. FIG. 3A depicts a representation of virtual and physical addresses in two probe groups (Probe Group A and B). Although depicted using 32-bit addressing, 64-bit addressing or any other bit addressing scheme may be used. Probe Group A may comprise page sizes of 4 KB, 8 KB, and 16 KB. The virtual address 310A of Probe Group A may comprise a VPN of the bits [31:14], two VBN bits [13:12], and an offset of the bits [11:0]. The VPN may be used in the comparison to the vtag of a TLB entry, the VBN may be used to select a valid bit to check, and the offset may be concatenated with the physical page number from a matched TLB entry. Probe group B may comprise a similar virtual address 310B with the bits shifted to account for larger page sizes (i.e. VPN[31:19]).

Generating a physical address when using multiple valid bits to probe multiple page sizes in one probe cycle may depend on the size of the page being matched, and therefore the valid bits set in the TLB entry. For example, if there is a match in probe group A, the physical address 315A may comprise the concatenation of the PPN from the TLB entry with an offset from the virtual address 310A. If the page size is 4 KB then the physical address generated may comprise a PPN which may make up the bits [31:12] and the offset may include bits [11:0] from the virtual address 310A. If the page size is 8 KB then the physical address 315A may include an offset of bits [12:0] from the virtual address 310A and the PPN may make up the bits [31:13]. Finally, if the page size is 16 KB the physical address 315A may include an offset comprised of the [13:0] bits from the virtual address 310A and the PPN may make up bits [31:14].

A similar process may be used for probe group B, which may be comprised of 64 KB, 128 KB, and 256 KB page sizes. Because the page sizes are larger the offset must be larger. For example, if there is a match in probe group B, the physical address 315B may comprise the concatenation of the PPN from the TLB entry with an offset from the virtual address 310B. If the page size is 64 KB then the physical address generated may comprise a PPN which may make up the bits [31:17] and the offset may include bits [16:0] from the virtual address 310B. If the page size is 128 KB then the physical address 315B may include an offset of bits [17:0] from the virtual address 310B and the PPN may make up the bits [31:18]. Finally, if the page size is 256 KB the physical address 315A may include an offset comprised of the [18:0] bits from the virtual address 310A and the PPN may make up bits [31:19].

The above examples may represent generation of the physical address when coalescing is not supported by the TLB. In another example, coalescing may be supported when the virtual page and physical page are relatively aligned (e.g., the low bit, or bits, of the VPN equals the low bit, or bits, of the PPN). Using the example Probe Group A (i.e., 4 KB, 8 KB, and 16 KB page sizes), for an 8 KB relative alignment a 4 KB page may be mapped as if it were a 4 KB or 8 KB page. Thus, the physical address may be generated by concatenating the PPN with the offset VA[11:0], or by concatenating all but the lowest bit of the PPN and the offset VA[12:0]. The same approach may be applied for a 16 KB relative alignment such that 4 KB pages, or 8 KB pages may be mapped as if they were a 16 KB page. For the 16 KB relative alignment, the physical address may be generated the same as in the case of an 8 KB relative alignment, or by concatenating all but the lowest two bits of the PPN with the offset VA[13:0]. This approach to coalescing may be supported by a TLB using multiple valid bits to probe multiple page sizes in a single probe cycle.

In yet another example, if general coalescing is supported then the physical address may be generated by adding the VBN to the VPN. Then the result of the add operation may be concatenated with the offset from the virtual address. The add operation may be either a wide add or a narrow add. A narrow-adder is described in detail below with respect to FIG. 5. General coalescing may also be supported by a TLB using multiple valid bits to probe multiple page sizes in a single probe cycle.

Although FIG. 3A depicts only two probe groups, each comprised of three page sizes, it should be noted that any number of probe groups and any number of page sizes within a probe group may be used. Furthermore, the selection of the bits is merely illustrative and any bits of a virtual and physical address may be used in another implementation.

FIG. 3B is a block diagram illustrating example TLB entries with multiple valid bits used by TLB control logic to probe multiple page sizes in a single probe cycle. Each entry in the TLB may comprise a virtual tag ("vtag"), a set of valid bits, a size tag indicating the probe group associate with the entry, a set of permissions bits and a physical page number. As described above with respect to FIG. 2A, the TLB logic may probe the TLB for an entry which maps a particular virtual address to a physical address. If there is a match then the physical address may be generated using the physical page number and the offset from the virtual address. The number of valid bits that are set as valid may indicate a page size with respect to a probe group. For example, if one bit is set as in the four entries 350 the then the entry may be associated with the smallest page of the probe group (e.g., 4

KB in the 4 KB, 8 KB, and 16 KB probe group). If two valid bits are set, as in entries 352, the entry may be associated with the next largest page size (e.g., 8 KB page size). If four bits are set as in entry 354, the entry may be associated with the next largest page size (e.g., 16 KB page size). When a TLB miss occurs and a new entry is created, the valid bits that are set may be set according to the page size as described above, and in view of the VBN bits. For example, if the page size for the new TLB entry is 4 KB then the virtual bit that is set may correspond to the VBN.

FIG. 4 is a block diagram illustrating a series of example configurations of a TLB with reconfigurable sub-TLBs. A TLB 400A-C may include one or more sub-TLBs. Each sub-TLB may comprise a capacity for a defined number of TLB entries (e.g., 64 entries, 128 entries, or 16 entries, as depicted). The sub-TLBs may additionally be reconfigurable to store TLB entries for different page sizes. Each sub-TLB may support a hash function for each of the page sizes supported by the sub-TLB. In one example, each sub-TLB may support different probe groups and thus may support a hash function associated with each of the probe groups. The sub-TLBs may support a large enough number of virtual address bits, or vtag bits, and physical address, or PPN bits for each of the page sizes, or probe groups the sub-TLB supports. The number of offset bits that are combined with the PPN to create a physical address may depend on the page size. Each sub-TLB may support a unique set of page sizes or the page sizes supported may span more than one of the sub-TLBS.

The sub-TLBs may be configured post-manufacturing using a number of different mechanisms. The sub-TLBs may be configured by setting fuses after manufacturing the SOC. Once the sub-TLBs are set in this manner the processor may have a well-defined behavior but may be unable to be reconfigured. In one example, the sub-TLBs may be configured at boot-time initialization. In another example, the operating system may request that the TLB configuration to be changed according to usage patterns. The processor may provide a configuration register, as depicted in FIG. 1, to adjust the sub-TLB configuration based on workload or on a per process basis. Additionally, the TLB and sub-TLBs may be configured by an application. Therefore, the application may be able to reconfigure the TLB even if the application is executed on a legacy OS that is not enabled to reconfigure the TLB. Finally, hardware may monitor TLB usage and automatically reconfigure the TLB based on the TLB usage. Two or more of the above approaches may be combined. For example, post manufacturing may enable a set of configurations, an OS may choose one of those configurations as a default for typical workloads, and an application may request reconfiguration based on the application's behavior.

Using any manner described above, or any other method of reconfiguring a sub-TLB, each sub-TLB may be adjusted to maximize the number of page sizes supported by the TLB and/or to minimize TLB misses. In one example, as depicted in FIG. 4, a TLB 400A-C may comprise three sub-TLBs 410A-414A, 410B-414B, and 410C-114C. TLB 400A depicts a first example configuration of the TLB 400. The sub-TLB 410A may be configured to store entries for 4 KB pages, sub-TLB 412A may be configured to store entries for 2 MB pages, and sub-TLB 414A may be configured to store entries for 1 GB pages. The configuration for TLB 400A may be set by the operating system to support a first workload or process that touches a large number of 2 MB pages, but only a few 1 GB pages.

In another example, TLB 400B may be the same as TLB 400A with a new configuration after being reconfigured. TLB 400B may be reconfigured in view of a second workload or process. The sub-TLB 410B may be configured to store entries for 2 MB pages, sub-TLB 412B may be configured to store entries for 4 KB pages, and sub-TLB 414B may be configured to store entries for 1 GB pages. The configuration for TLB 400B may be set by the operating system to support the workload or process because the workload touches a large number of 4 KB pages, only a few 1 GB pages, and some moderate number of 2 MB pages.

In yet another example, TLB 400C may be the same as TLB 400A-B with a third configuration after being reconfigured once again. TLB 400C may be reconfigured in view of a third workload or process. The sub-TLBs may be configured such that a single page size spans more than one of the sub-TLBs. For example, the sub-TLB 410C may be configured to store entries for 4 KB pages, sub-TLB 412C may also be configured to store entries for 4 KB pages, and sub-TLB 414C may be configured to store entries for 2 MB pages. The configuration for TLB 400C may be set by the operating system to support a first workload or process that touches a large number of 4 KB pages and a moderate number of 2 MB pages. If a process uses a page size that the TLB is not configured to support then the TLB may be reconfigured to support the page size, as discussed above. Alternatively, the page mapping may be cracked, or fractured, into multiple page mappings of page sizes that the TLB does support.

Although depicted as supporting single page sizes, the sub-TLBs may additionally support a number of probe groups. Each sub-TLB may be configured to store any page size for a given set of probe groups. In another example, each sub-TLB may store pages for a single probe group and each page size within the probe group may be determined based multiple valid bits of each TLB entry.

Figure 5A:
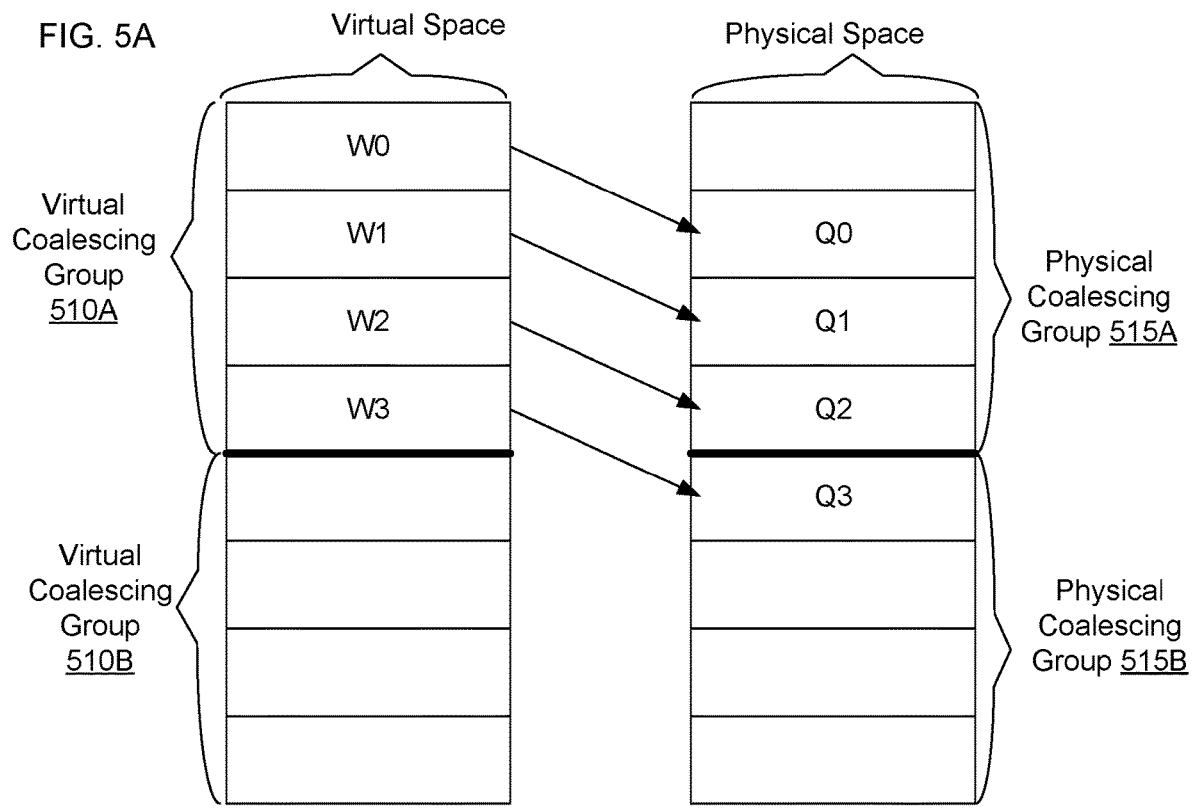
FIG. 5A is a block diagram illustrating coalescing using a narrow-adder according to one implementation.
Figure 5B:
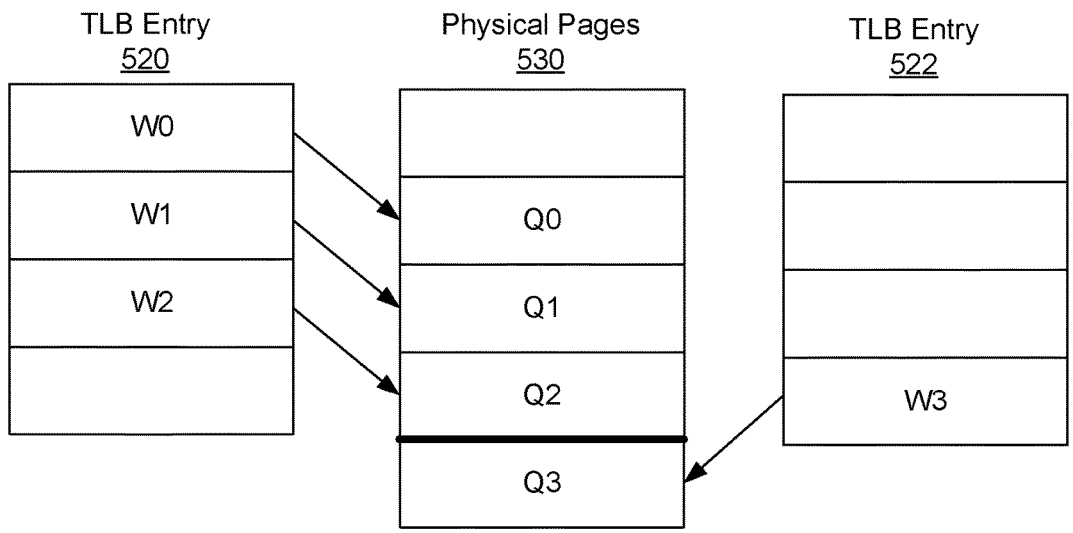
FIG. 5B is a block diagram illustrating coalescing using a narrow-adder according to one implementation.

FIGS. 5A and 5B depict block diagrams illustrating coalescing using a narrow adder to avoid carry propagation. FIG. 5A depicts a virtual coalescing group that maps to physical pages that span two physical coalescing groups 515A-B. FIG. 5B depicts multiple TLB entries created for a narrow adder. Without a narrow-adder, when accessing the physical page Q3 through the W3 virtual page the generation of the physical address may require a "wide-adder." A wide-adder may add VBN to the entire PPN, meaning that the wide adder must be as wide as the VBN to support a carry operation. A wide-adder has a large overhead with respect to area, power, and speed of the TLB. In contrast, the narrow-adder may add the VBN bits to the low bits of the PPN, while the high bits of the physical address are simply copied form the high bits of the PPN. Therefore, the narrow adder may be as narrow as the number of bits of the VBN. Because the narrow-adder does not support a carry operation across some physical coalescing groups, the TLB may comprise logic to generate two TLB entries when a virtual coalescing group maps to physical pages that span two physical coalescing groups.

For example, as depicted in FIG. 5B, W0, W1, and W2 of virtual coalescing group 510A may map to pages within a single physical coalescing group 515A. However, W3 of the virtual coalescing group 510A may map to Q3 which is located in a second physical coalescing group 515B. Therefore, rather than generating a single TLB entry comprising mappings for W0, W1, W2, and W3, a TLB using a narrow-adder may generate two TLB entries 520 and 522. TLB entry 520 may comprise the mapping between W0, W1, W2 and Q0, Q1, Q3. TLB entry 522 may comprise the mapping from W3 to Q3. Therefore, the calculation of the physical address would not require a wide carry operation. The address can simply be generated by adding the low bits of the PPN to the VBN (i.e. the narrow adder) and appending the offset.

Figure 6:
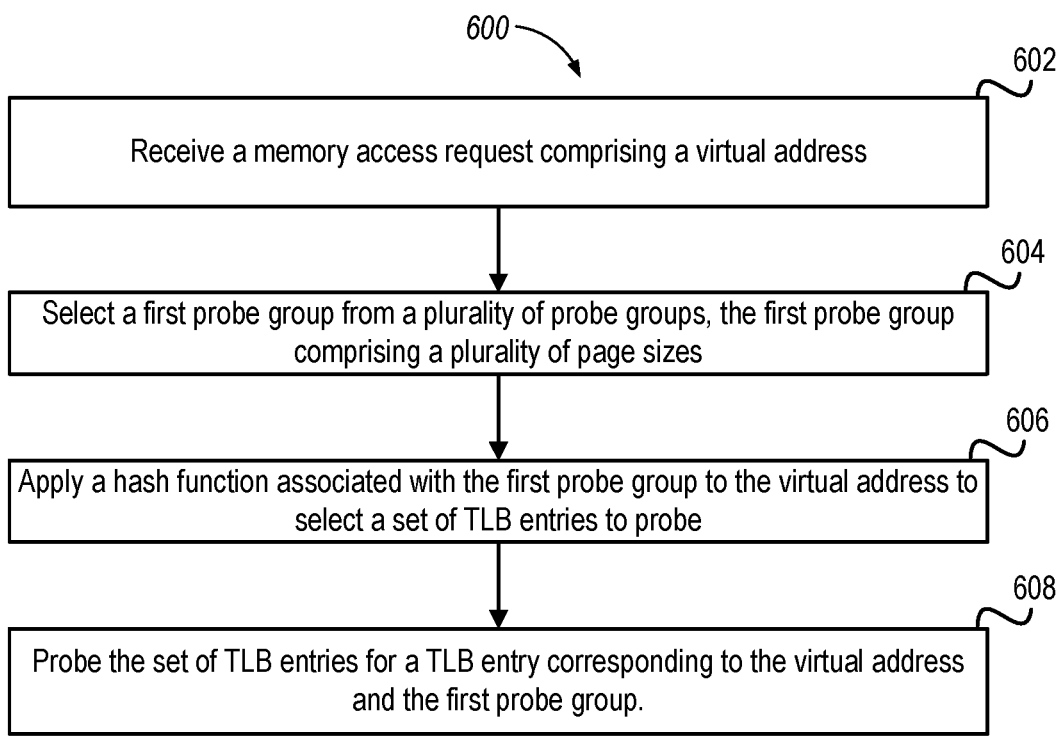
FIG. 6 is a flow diagram of an example method for probing multiple TLB entry page sizes in a single probe cycle according to one implementation.

FIG. 6 is a flow diagram of an example method 600 for probing multiple TLB entry page sizes in a single probe cycle. At block 602, a TLB may receive a memory access request comprising a virtual address. The virtual address may comprise a virtual page number (VPN) and an offset. The virtual address may correspond to a physical address, the mapping of which may be stored in a page table and cached in a TLB. At block 604, the TLB may select a first probe group from a plurality of probe groups. The probe group may comprise a plurality of page sizes. The TLB may support any number of probe groups, each probe group comprising a unique set of page sizes that may be probed in a single probe cycle.

At block 606, the TLB may apply a hash function associated with the first probe group to the virtual address. Any number of bits may be used to hash the virtual address. In one example the number of bits used to hash the virtual address may be at least $\log_2(N)$ bits, wherein N is the number of sets to hash. Each of the plurality of probe groups may be associated with a single hash function. The hash function for each probe group may be a hash function for a page size of the probe group. For example, the hash function for each probe group may be the hash function for the largest page size of the probe group. Finally, at block 608 the TLB may probe the set of TLB entries for a TLB entry that corresponds to the virtual address. The TLB logic may probe the TLB using each probe group either until a match is found or until there are no probe groups remaining to probe the TLB. If a TLB entry is matched then the physical address may be generated using the PPN from the TLB entry and an offset from the virtual address. The number of bits included in the offset from the virtual address may depend on the page size for the TLB entry. If there is no match then a TLB entry may be evicted and a new TLB entry created with a number of valid bits set according to the size of the page being mapped by the TLB entry.

Figure 7:
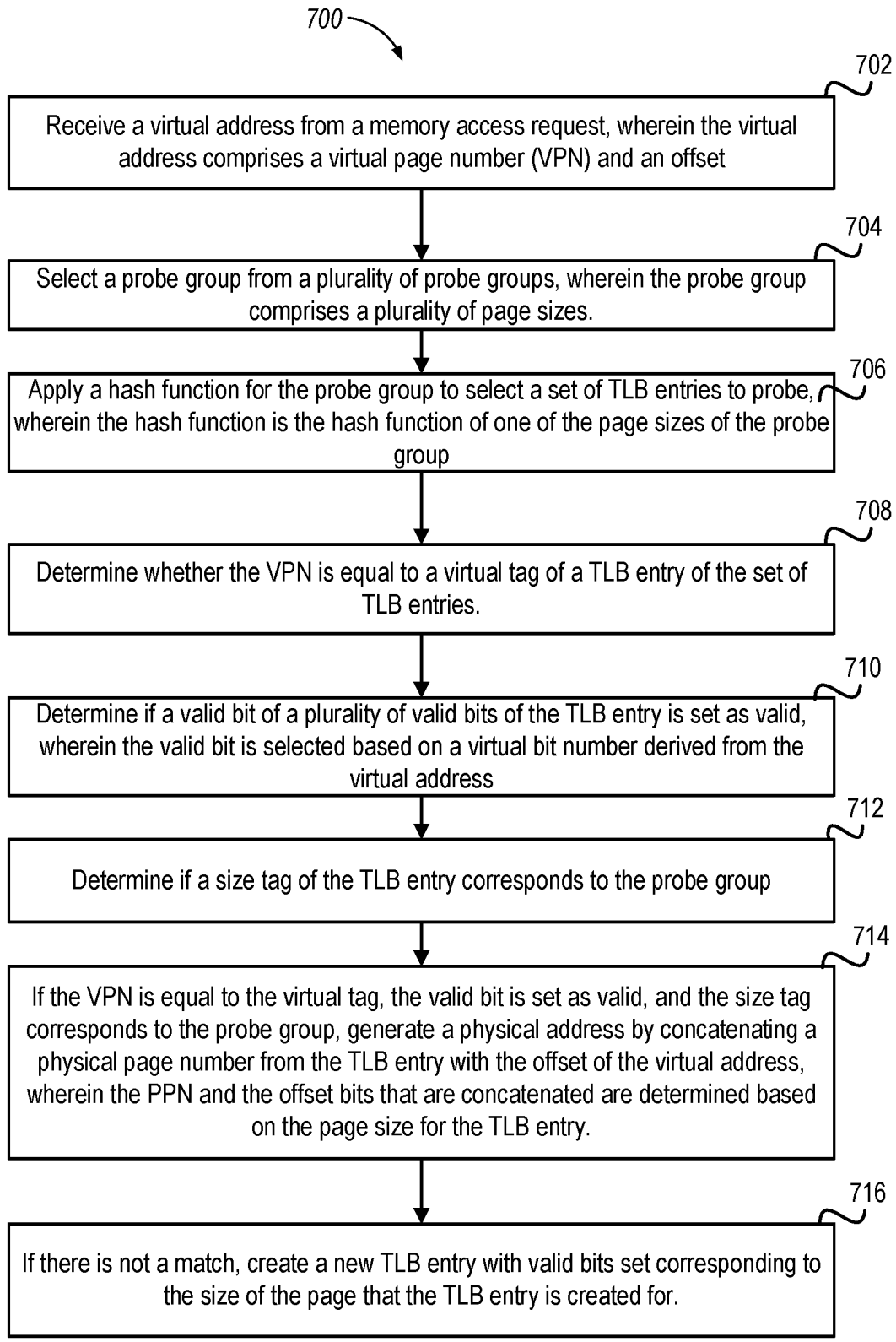
FIG. 7 is a detailed flow diagram of an example method for probing multiple TLB entry page sizes in a TLB with reconfigurable sub-TLBs according to one implementation.

FIG. 7 is a flow diagram of an example method for probing multiple TLB entry probe sizes in a TLB with reconfigurable sub-TLBs. At block 702, TLB control logic may receive a virtual address from a memory access request. The virtual address may be an address used by an application that must be mapped to a physical address where data is stored in physical memory. The virtual address may comprise a virtual page number and an offset. A virtual bit number used to select a valid bit may be included in the VPN and/or the offset of the virtual address.

At block 704, the TLB control logic may select a probe group from a plurality of probe groups. Each probe group of the plurality of probe groups may comprise a plurality of page sizes. A first probe group may be selected to probe the TLB a first time, and if there is not a match to a TLB as described below, then a second probe group may be selected and then a third and so on until there are no probe groups left to probe the TLB. A probe group may comprise groups of similar page sizes. Probe groups may also include any number of page sizes supported by the number of valid bits or values used to identify the page sizes within a probe group.

At block 706, the TLB control logic may apply a hash function associated with the probe group to select a set of TLB entries to probe. The hash function may be the hash function for a specified page size within the probe group. For example, the hash function may be the hash function for the largest page size of the probe group. Therefore, a single hash function may hash to any page size within the probe group. In one example, using a single hash function to hash to any page size may support a sub-TLB being reconfigurable to support different page sizes. The single hash function along with the multiple valid bits may provide for simple reconfiguration for a sub-TLB because a single hash function may be used to hash for the multiple page sizes that the sub-TLB may be configured to support.

At block 708, the TLB control logic may determine whether the VPN is equal to a virtual tag of a TLB entry. The VPN from the virtual address may be the same for each page size within a probe group. Thus, there may be a vtag match with the VPN for any page size of the probe group. Tag matching multiple page sizes may allow the TLB control logic to probe the multiple page sizes in a single probe cycle. At block 710, the TLB control logic may determine if a particular valid bit is set as valid. Determining if a particular valid bit is set may comprise determining which valid bit to check. The bits or the value comprising the valid bit number from the virtual address (e.g., bits [13:12]) may determine which bit is to be checked. If the bit, or value, identified by the valid bit number is set as valid then the process goes to block 712. However, if the identified valid bit is not set as valid, then there is not a match.

At block 712, the TLB control logic may determine if a size tag of the TLB entry corresponds to the probe group selected at block 704. The size tag may indicate a probe group to which the entry corresponds. In one example, if there are two probe groups then the size tag may comprise a single bit that may identify one of the two probe groups. If the size tag does not match the current probe group then there is not a match. However, if the size tag matches, along with matches at block 708 and 710, then the TLB entry is the entry that corresponds to the virtual address.

At block 714, if there is a TLB match according to blocks 708, 710, and 712, the TLB control logic may generate a physical address by concatenating a physical page number (PPN) from the TLB entry with the offset from the virtual address. The bits from the virtual address used as the offset may depend on the page size associated with the TLB entry. For example, the larger the page size is the more bits from the virtual address may be used as the offset.

At block 716, if there is not a TLB match, the TLB control logic may create a new TLB entry with valid bits set corresponding to the size of the page to which the TLB entry maps. The TLB control logic may evict a TLB entry based on an eviction algorithm such as least recently used. The TLB control logic may then retrieve a page table entry from a page table in memory and store the page table entry as the new TLB entry. Along with the mapping and permissions bits from the page table entry, the TLB control logic may additionally set one or more valid bits of the plurality of valid bits. The bits may be set according to the probe group and the page size for the TLB entry. For example, if the entry is for the smallest page size of the probe group then only one bit will be set. The one bit that is set may be determined based on the valid bit number of the virtual address for the entry. If the TLB entry is for the next largest page size then two valid bits may be set, and four valid bits may be set for the next largest page size after that, and so forth.

Although described with respect to a single TLB, the method 700 may also be used with one or more sub-TLBs of a TLB. Each sub-TLB may support a set of probe groups. Additionally, the sub-TLBs may be reconfigured to support a different set of probe groups according to a configuration register controlled by an operating system or any other manner. The method 700 may also be used to provide support for reconfiguration of sub-TLBs through the use of a single hash function and multiple valid bits to probe a sub-TLB for different page sizes.

Figure 8:
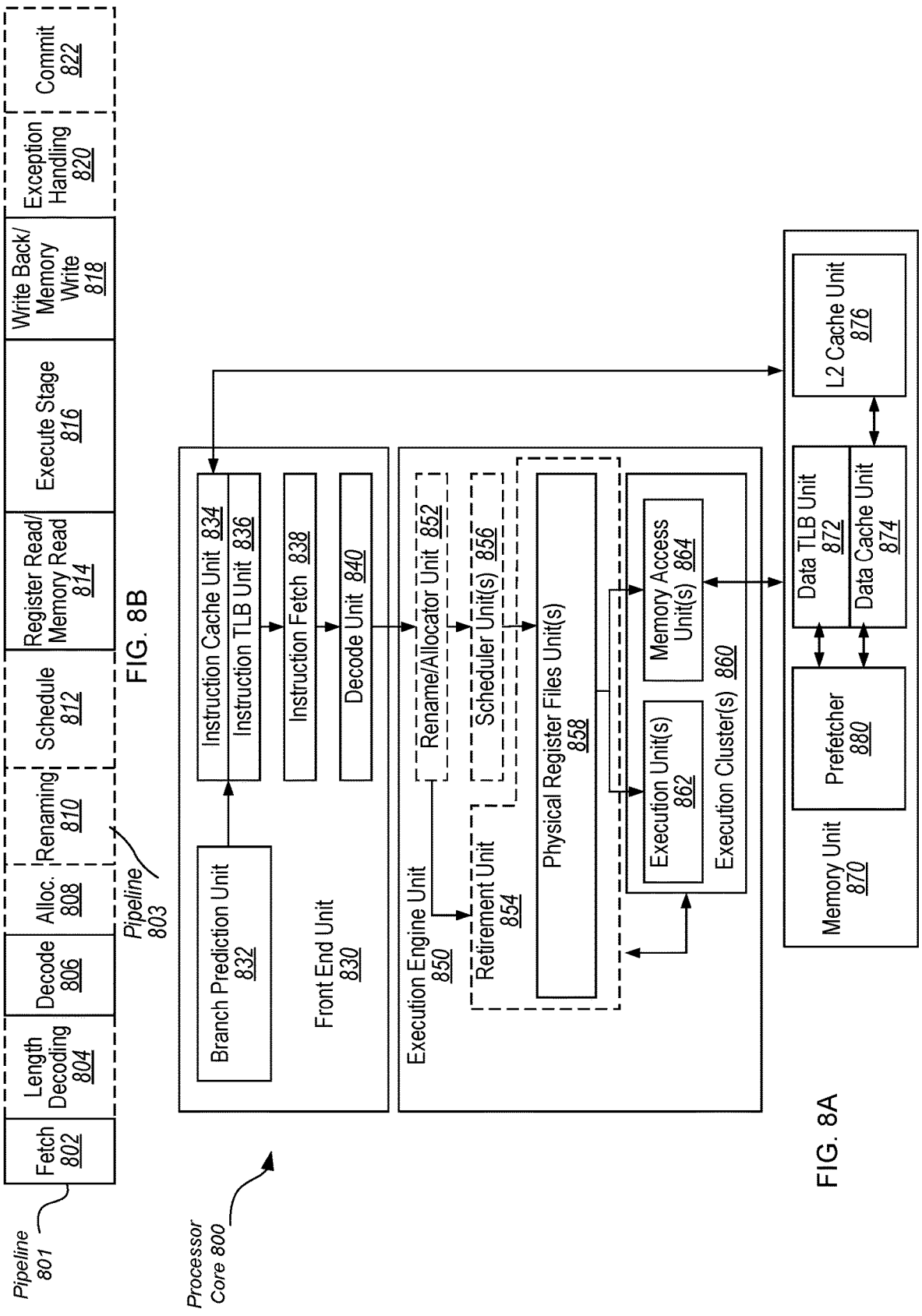
FIG. 8A is a block diagram illustrating an in-order pipeline and a register renaming stage, out-of-order issue/execution pipeline according to one implementation.
FIG. 8B is a block diagram illustrating a micro-architecture for a processor or an integrated circuit that may implement hardware support for a multi-key cryptographic engine, according to an implementation of the disclosure.

FIG. 8A is a block diagram illustrating a micro-architecture for a processor 800 that implements hardware support for using multiple valid bits to probe multiple page sizes in one probe cycle in reconfigurable sub-TLBs. Specifically, processor 800 depicts an in-order architecture core and a register renaming logic, out-of-order issue/execution logic to be included in a processor according to at least one implementation of the disclosure.

Processor 800 includes a front end unit 830 coupled to an execution engine unit 850, and both are coupled to a memory unit 870. The processor 800 may include a reduced instruction set computing (RISC) core, a complex instruction set computing (CISC) core, a very long instruction word (VLIW) core, or a hybrid or alternative core type. As yet another option, processor 800 may include a special-purpose core, such as, for example, a network or communication core, compression engine, graphics core, or the like. In one implementation, processor 800 may be a multi-core processor or may be part of a multi-processor system.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 840 may be implemented using various different mechanisms. Examples of suitable mechanisms include, but are not limited to, look-up tables, hardware implementations, programmable logic arrays (PLAs), microcode read only memories (ROMs), etc. The instruction cache unit 834 is further coupled to the memory unit 870. The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different scheduler circuits, including reservations stations (RS), central instruction window, etc. The scheduler unit(s) 856 is coupled to the physical register set(s) unit(s) 858. Each of the physical register set(s) units 858 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 858 is overlapped by the retirement unit 854 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 854 and the physical register set(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 856, physical register set(s) unit(s) 858, and execution cluster(s) 860 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which may include a data prefetcher 880, a data TLB unit 872, a data cache unit (DCU) 874, and a level 2 (L2) cache unit 876, to name a few examples. In some implementations DCU 874 is also known as a first level data cache (L1 cache). The DCU 874 may handle multiple outstanding cache misses and continue to service incoming stores and loads. It also supports maintaining cache coherency. The data TLB unit 872 is a cache used to improve virtual address translation speed by mapping virtual and physical address spaces. In one exemplary implementation, the memory access units 864 may include a load unit, a store address unit, and a store data unit, each of which is coupled to the data TLB unit 872 in the memory unit 870. The L2 cache unit 876 may be coupled to one or more other levels of cache and eventually to a main memory.

In one implementation, the data prefetcher 880 speculatively loads/prefetches data to the DCU 874 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 800 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 8B is a block diagram illustrating an in-order pipeline and a register renaming stage, out-of-order issue/execution pipeline implemented by processor 800 of FIG. 8A according to some implementations of the disclosure. The solid lined boxes in FIG. 8B illustrate an in-order pipeline 801, while the dashed lined boxes illustrate a register renaming, out-of-order issue/execution pipeline 803. In FIG. 8B, the pipelines 801 and 803 include a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824. In some implementations, the ordering of stages 802-824 may be different than illustrated and are not limited to the specific ordering shown in FIG. 8B.

Figure 9:
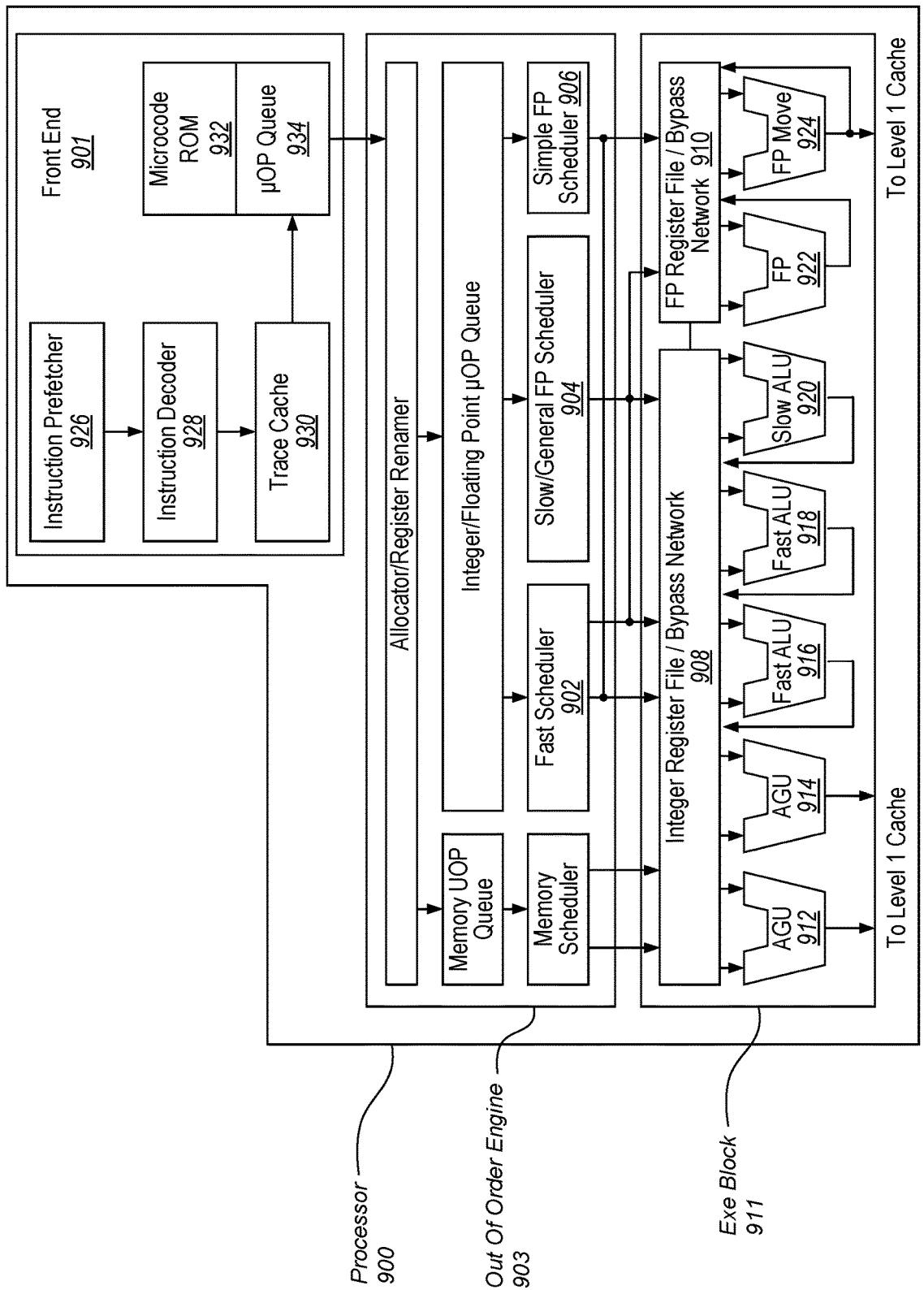
FIG. 9 illustrates a block diagram of the micro-architecture for a processor or an integrated circuit that implements hardware support for a multi-key cryptographic engine, according to an implementation of the disclosure.

FIG. 9 illustrates a block diagram of the micro-architecture for a processor 900 that includes logic circuits of a processor or an integrated circuit that implements hardware support for using multiple valid bits to probe multiple page sizes in one probe cycle in reconfigurable sub-TLBs, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 901 is the part of the processor 900 that fetches instructions to be executed and prepares them to be used later in the processor pipeline. The implementations of the page additions and content copying can be implemented in processor 900.

The front end 901 may include several units. In one implementation, the instruction prefetcher 916 fetches instructions from memory and feeds them to an instruction decoder 918 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 930 takes decoded uops and assembles them into program ordered sequences or traces in the uop queue 934 for execution. When the trace cache 930 encounters a complex instruction, microcode ROM (or RAM) 932 provides the uops needed to complete the operation.

Some instructions are converted into a single micro-op, whereas others need several micro-ops to complete the full operation. In one implementation, if more than four micro-ops are needed to complete an instruction, the decoder 918 accesses the microcode ROM 932 to do the instruction. For one implementation, an instruction can be decoded into a small number of micro ops for processing at the instruction decoder 918. In another implementation, an instruction can be stored within the microcode ROM 932 should a number of micro-ops be needed to accomplish the operation. The trace cache 930 refers to an entry point programmable logic array (PLA) to determine a correct micro-instruction pointer for reading the micro-code sequences to complete one or more instructions in accordance with one implementation from the micro-code ROM 932. After the microcode ROM 932 finishes sequencing micro-ops for an instruction, the front end 901 of the machine resumes fetching micro-ops from the trace cache 930.

The out-of-order execution engine 903 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 902, slow/general floating point scheduler 904, and simple floating point scheduler 906. The uop schedulers 902, 904, 906, determine when a uop is ready to execute based on the readiness of their dependent input register operand sources and the availability of the execution resources the uops need to complete their operation. The fast scheduler 902 of one implementation can schedule on each half of the main clock cycle while the other schedulers can only schedule once per main processor clock cycle. The schedulers arbitrate for the dispatch ports to schedule uops for execution.

Register sets 908, 910, sit between the schedulers 902, 904, 906, and the execution units 912, 914, 916, 918, 920, 922, 924 in the execution block 911. There is a separate register set 908, 910, for integer and floating point operations, respectively. Each register set 908, 910, of one implementation also includes a bypass network that can bypass or forward just completed results that have not yet been written into the register set to new dependent uops. The integer register set 908 and the floating point register set 910 are also capable of communicating data with the other. For one implementation, the integer register set 908 is split into two separate register sets, one register set for the low order 32 bits of data and a second register set for the high order 32 bits of data. The floating point register set 910 of one implementation has 128 bit wide entries because floating point instructions typically have operands from 64 to 128 bits in width.

The execution block 911 contains the execution units 912, 914, 916, 918, 920, 922, 924, where the instructions are actually executed. This section includes the register sets 908, 910, that store the integer and floating point data operand values that the micro-instructions need to execute. The processor 900 of one implementation is comprised of a number of execution units: address generation unit (AGU) 912, AGU 914, fast ALU 916, fast ALU 918, slow ALU 920, floating point ALU 912, floating point move unit 914. For one implementation, the floating point execution blocks 912, 914, execute floating point, MMX, SIMD, and SSE, or other operations. The floating point ALU 912 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 916, 918. The fast ALUs 916, 918, of one implementation can execute fast operations with an effective latency of half a clock cycle. For one implementation, most complex integer operations go to the slow ALU 920 as the slow ALU 920 includes integer execution hardware for long latency type of operations, such as a multiplier, shifts, flag logic, and branch processing. Memory load/store operations are executed by the AGUs 922, 924. For one implementation, the integer ALUs 916, 918, 920, are described in the context of performing integer operations on 64 bit data operands. In alternative implementations, the ALUs 916, 918, 920, can be implemented to support a variety of data bits including 16, 32, 128, 256, etc. Similarly, the floating point units 922, 924, can be implemented to support a range of operands having bits of various widths. For one implementation, the floating point units 922, 924, can operate on 128 bits wide packed data operands in conjunction with SIMD and multimedia instructions.

In one implementation, the uops schedulers 902, 904, 906, dispatch dependent operations before the parent load has finished executing. As uops are speculatively scheduled and executed in processor 900, the processor 900 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 10:
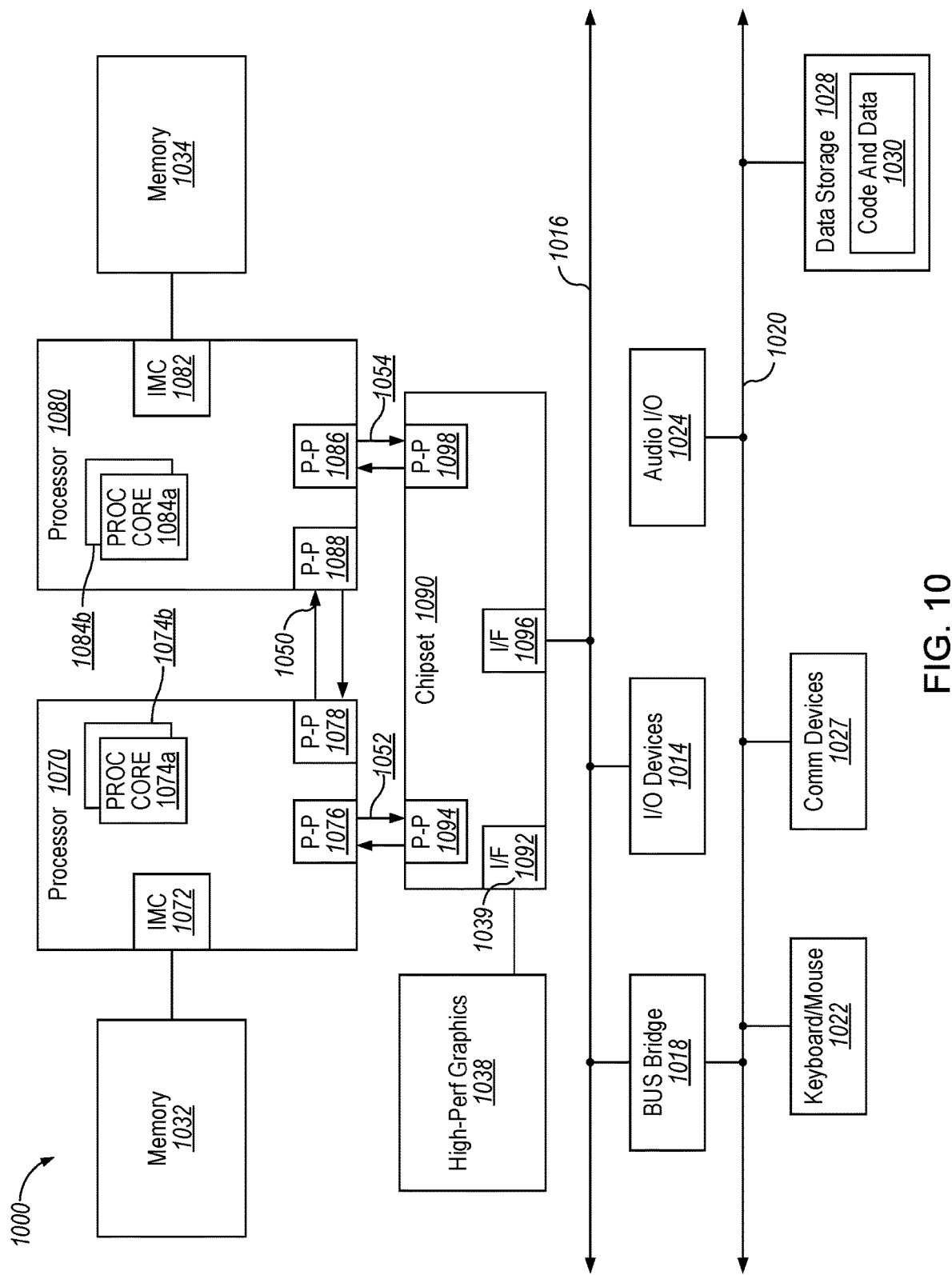
FIG. 10 is a block diagram of a computer system according to one implementation.

Implementations may be implemented in many different system types. Referring now to FIG. 10, shown is a block diagram of a multiprocessor system 1000 that may implement hardware support for using multiple valid bits to probe multiple page sizes in one probe cycle in reconfigurable sub-TLBs. As shown in FIG. 10, multiprocessor system 1000 is a point-to-point interconnect system, and includes a first processor 1070 and a second processor 1080 coupled via a point-to-point interconnect 1050. As shown in FIG. 10, each of processors 1070 and 1080 may be multicore processors, including first and second processor cores (i.e., processor cores 1074a and 1074b and processor cores 1084a and 1084b), although potentially many more cores may be present in the processors. While shown with two processors 1070, 1080, it is to be understood that the scope of the disclosure is not so limited. In other implementations, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1088; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

Chipset 1090 may be coupled to a first bus 1016 via an interface 1096. In one implementation, first bus 1016 may be a Peripheral Component Interconnect (PCI) bus, or a bus such as a PCI Express bus or interconnect bus, although the scope of the disclosure is not so limited.

Figure 11:
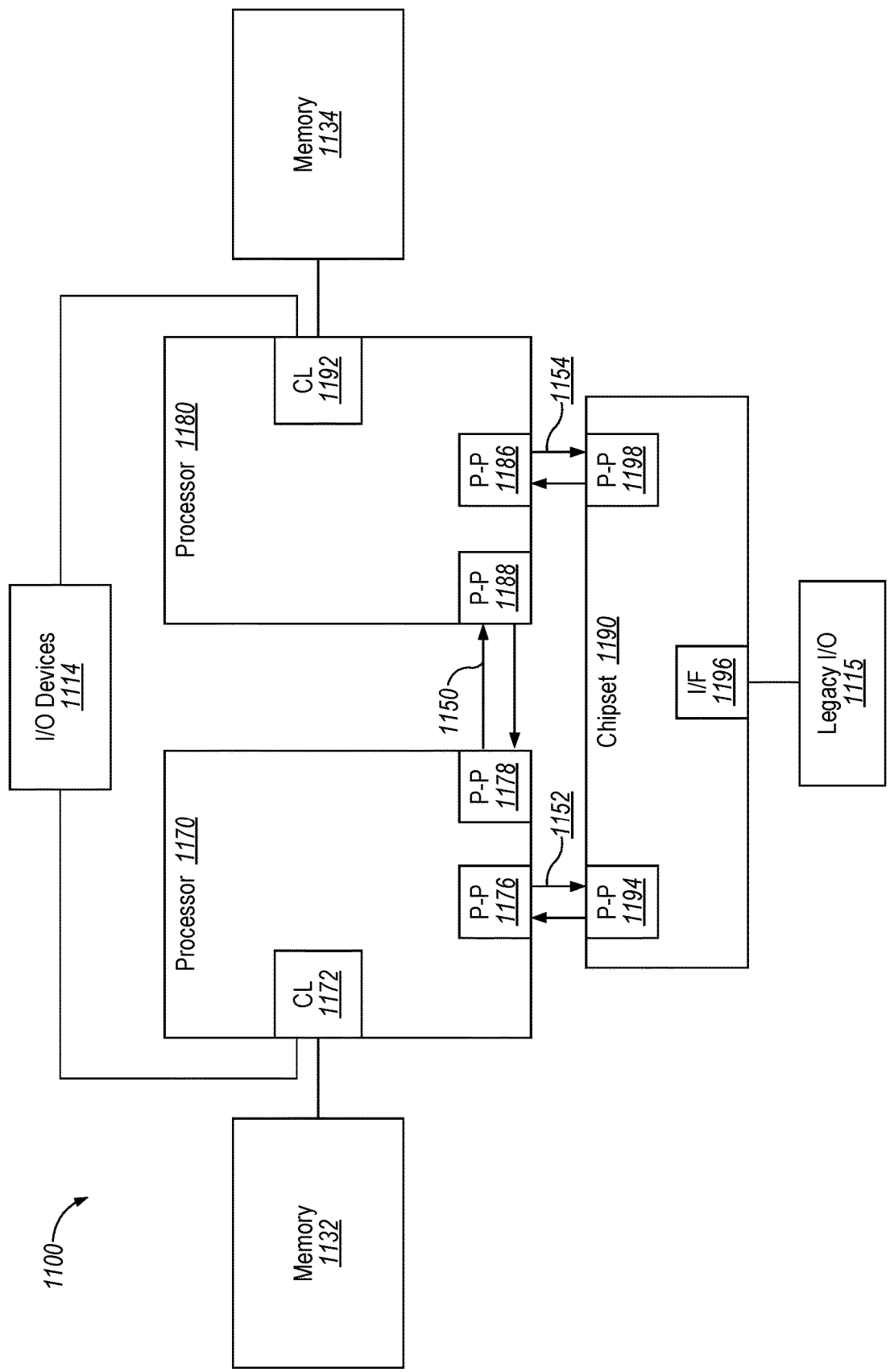
FIG. 11 is a block diagram of a computer system according to another implementation.

Referring now to FIG. 11, shown is a block diagram of a third system 1000 that may implement hardware support for using multiple valid bits to probe multiple page sizes in one probe cycle in reconfigurable sub-TLBs, in accordance with an implementation of the disclosure. Like elements in FIGS. 10 and 11 bear like reference numerals and certain aspects of FIG. 10 have been omitted from FIG. 11 in order to avoid obscuring other aspects of FIG. 11.

FIG. 11 illustrates that the processors 1170, 1180 may include integrated memory and I/O control logic ("CL") 1172 and 1192, respectively. For at least one implementation, the CL 1172, 1182 may include integrated memory controller units such as described herein. In addition. CL 1172, 1192 may also include I/O control logic. FIG. 11 illustrates that the memories 1132, 1134 are coupled to the CL 1172, 1192, and that I/O devices 1114 are also coupled to the control logic 1172, 1192. Legacy I/O devices 1115 are coupled to the chipset 1190.

Figure 12:
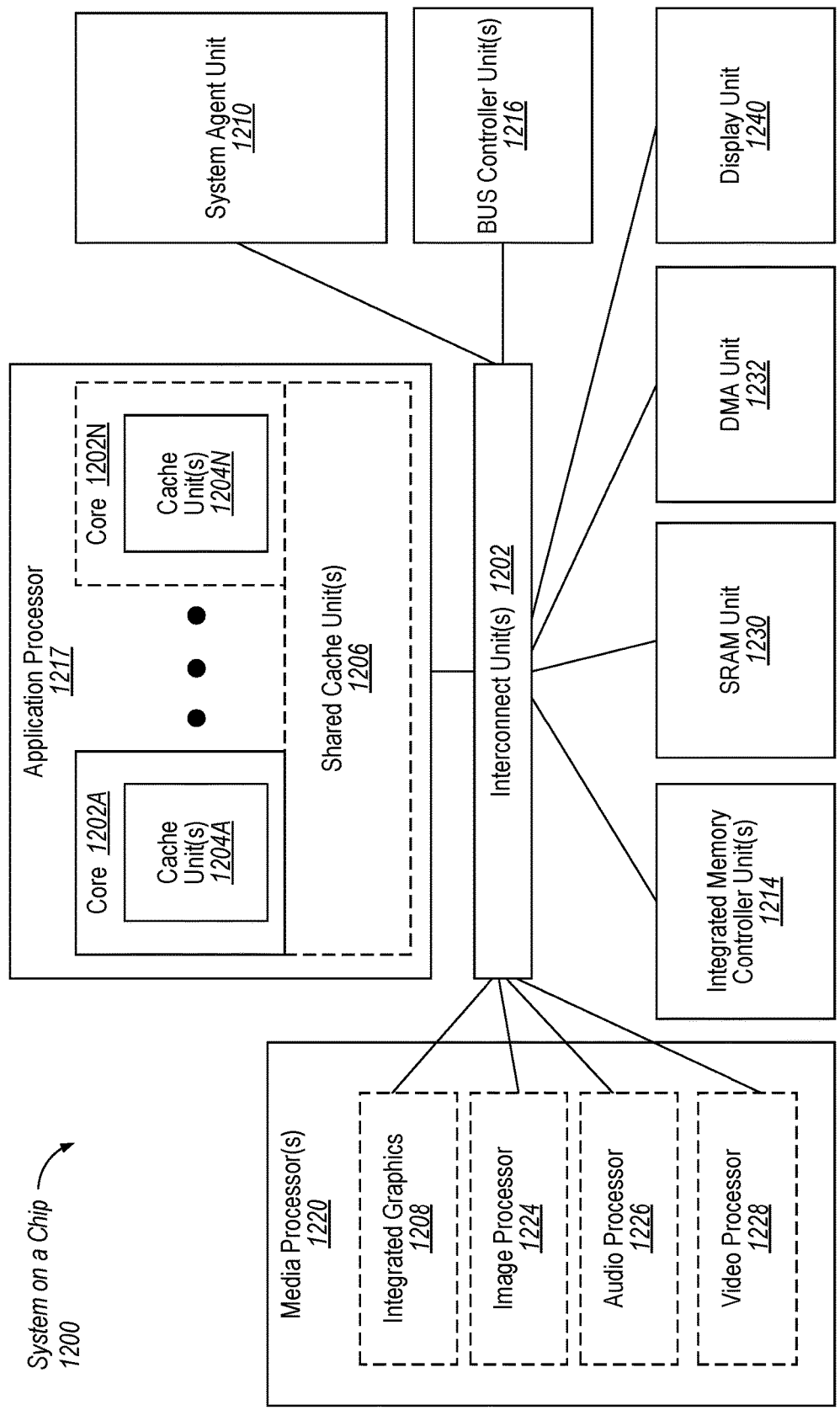
FIG. 12 is a block diagram of a system-on-a-chip according to one implementation.

FIG. 12 is an exemplary system on a chip (SoC) 1200 that may include one or more of the cores 1202A . . . 1202N that may implement hardware support for using multiple valid bits to probe multiple page sizes in one probe cycle in reconfigurable sub-TLBs. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1200 of FIG. 12, dashed lined boxes are features on more advanced SoCs. An interconnect unit(s) 1202 may be coupled to: an application processor 1217 which includes a set of one or more cores 1202A-N and shared cache unit(s) 1206; a system agent unit 1210; a bus controller unit(s) 1216; an integrated memory controller unit(s) 1214; a set of one or more media processors 1220 which may include integrated graphics logic 1208, an image processor 1224 for providing still and/or video camera functionality, an audio processor 1226 for providing hardware audio acceleration, and a video processor 1228 for providing video encode/decode acceleration; a static random access memory (SRAM) unit 1230; a direct memory access (DMA) unit 1232; and a display unit 1240 for coupling to one or more external displays.

Figure 13:
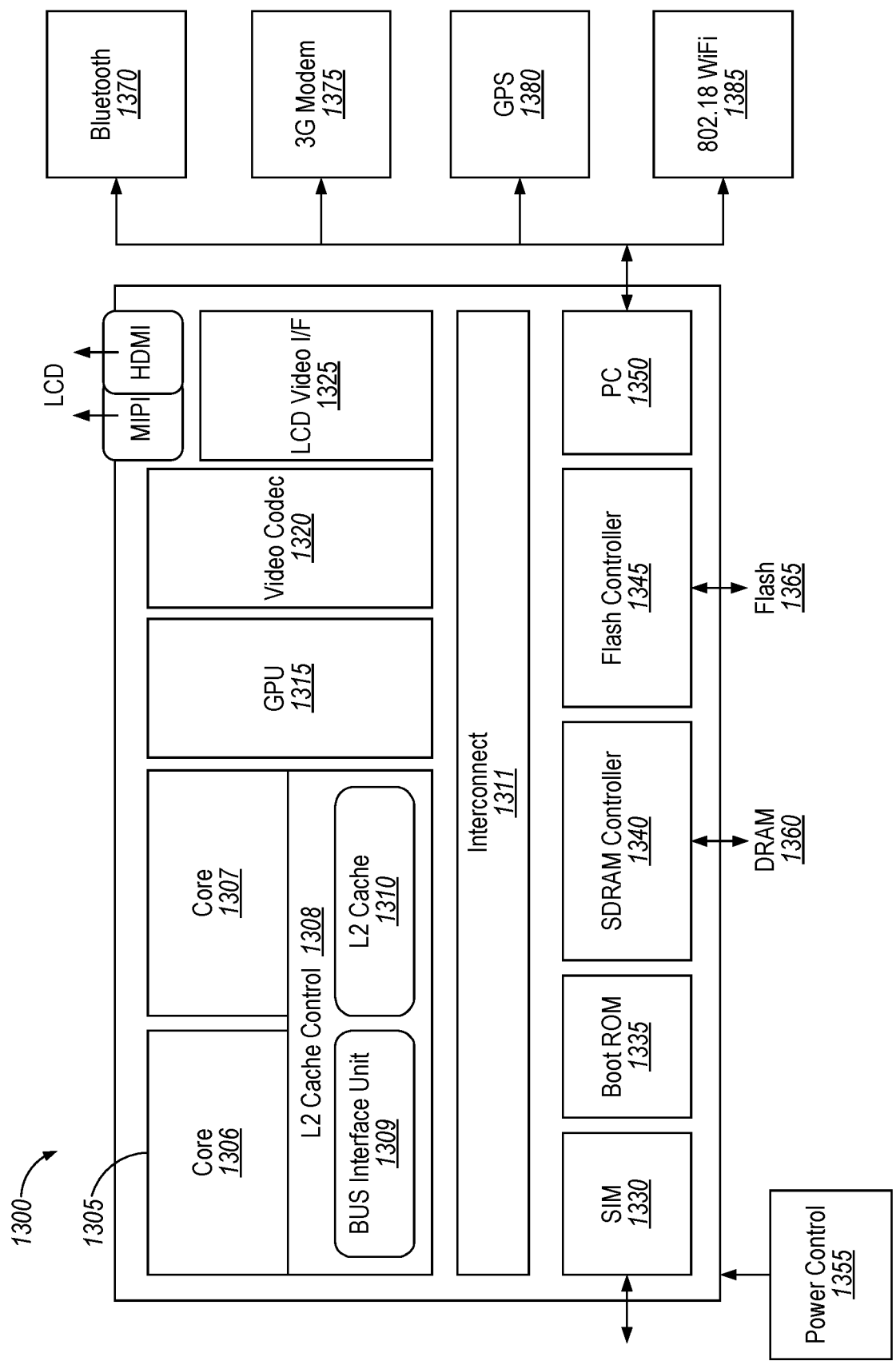
FIG. 13 illustrates another implementation of a block diagram for a computing system.

Turning next to FIG. 13, an implementation of a system on-chip (SoC) design that may implement hardware support for using multiple valid bits to probe multiple page sizes in one probe cycle in reconfigurable sub-TLBs, in accordance with implementations of the disclosure is depicted. As an illustrative example, SoC 1300 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1300.

Here, SoC 1300 includes 2 cores—1306 and 1307. Similar to the discussion above, cores 1306 and 1307 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1306 and 1307 are coupled to cache control 1308 that is associated with bus interface unit 1309 and L2 cache 1310 to communicate with other parts of system 1300. Interconnect 1311 includes an on-chip interconnect, such as an IOSF, AMBA, or other interconnects discussed above, which can implement one or more aspects of the described disclosure.

In one implementation, SDRAM controller 1340 may connect to interconnect 1311 via cache 1310. Interconnect 1311 provides communication channels to the other components, such as a Subscriber Identity Module (SIM) 1330 to interface with a SIM card, a boot ROM 1335 to hold boot code for execution by cores 1306 and 1307 to initialize and boot SoC 1300, a SDRAM controller 1340 to interface with external memory (e.g. DRAM 1360), a flash controller 1345 to interface with non-volatile memory (e.g. Flash 1365), a peripheral control 1350 (e.g. Serial Peripheral Interface) to interface with peripherals, video codecs 1320 and Video interface 1325 to display and receive input (e.g. touch enabled input), GPU 1315 to perform graphics related computations, etc. Any of these interfaces may incorporate aspects of the implementations described herein.

In addition, the system illustrates peripherals for communication, such as a Bluetooth® module 1370, 3G modem 1375, GPS 1380, and Wi-Fi® 1385. Note as stated above, a UE includes a radio for communication. As a result, these peripheral communication modules may not all be included. However, in a UE some form of a radio for external communication should be included.

Figure 14:
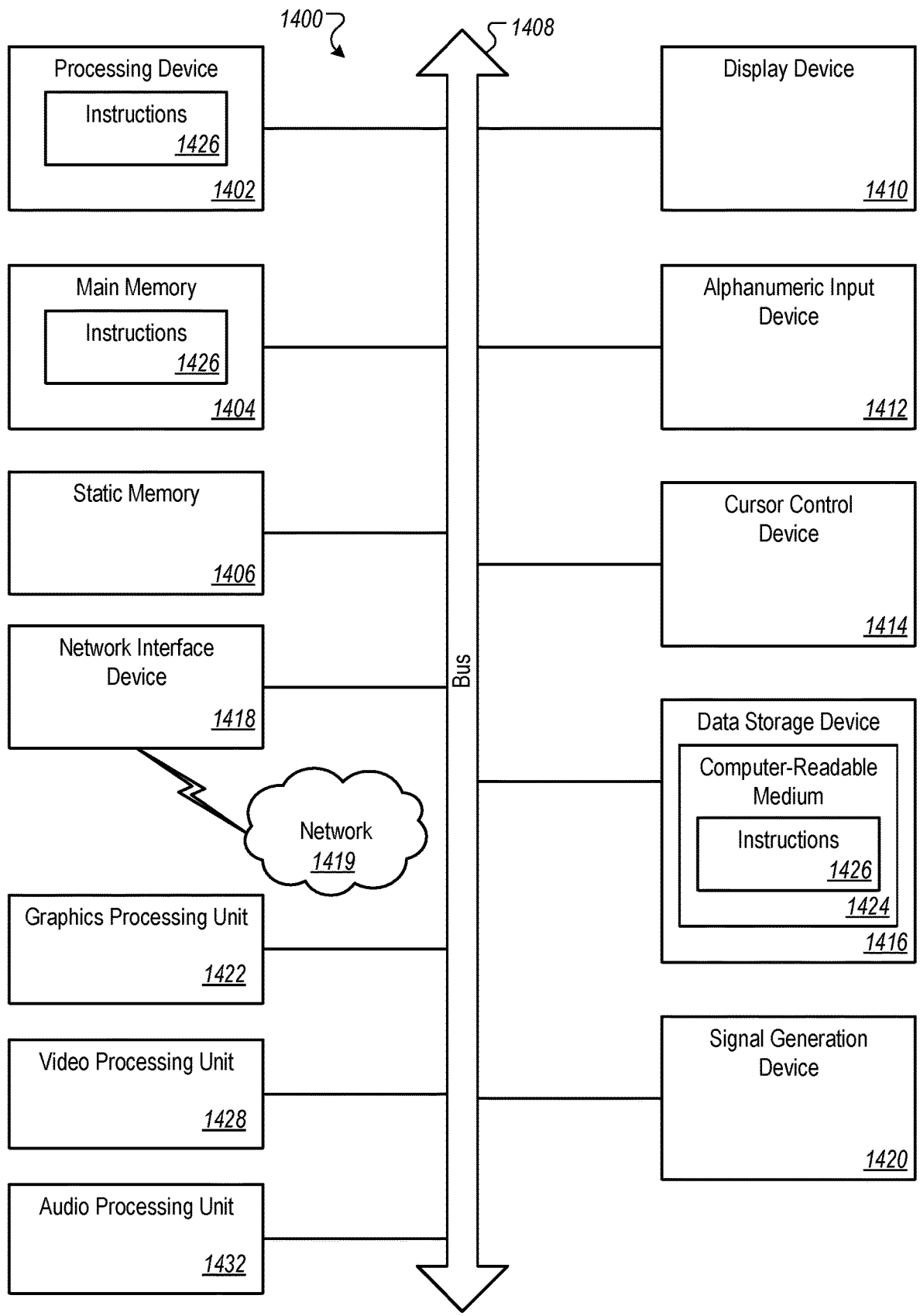
FIG. 14 illustrates another implementation of a block diagram for a computing system.

FIG. 14 illustrates a diagrammatic representation of a machine in the example form of a computing system 1400 within which a set of instructions, for causing the machine to implement hardware support for using multiple valid bits to probe multiple page sizes in one probe cycle in reconfigurable sub-TLBs according any one or more of the methodologies discussed herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1400.

The computing system 1400 includes a processing device 1402, main memory 1404 (e.g., flash memory, dynamic random access memory (DRAM) (such as synchronous DRAM (SDRAM) or DRAM (RDRAM), etc.), a static memory 1406 (e.g., flash memory, static random access memory (SRAM), etc.), and a data storage device 1416, which communicate with each other via a bus 1408.

Processing device 1402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1402 may also be one or more special-purpose processing devices such as an application-specific integrated circuit (ASIC), a field programmable gate array (FPGA), a digital signal processor (DSP), network processor, or the like. In one implementation, processing device 1402 may include one or more processor cores. The processing device 1402 is configured to execute the processing logic 1426 for performing the operations discussed herein.

In one implementation, processing device 1402 can be part of a processor or an integrated circuit that includes the disclosed LLC caching architecture. Alternatively, the computing system 1400 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1400 may further include a network interface device 1418 communicably coupled to a network 1419. The computing system 1400 also may include a video display device 1410 (e.g., a liquid crystal display (LCD) or a cathode ray tube (CRT)), an alphanumeric input device 1412 (e.g., a keyboard), a cursor control device 1414 (e.g., a mouse), a signal generation device 1420 (e.g., a speaker), or other peripheral devices. Furthermore, computing system 1400 may include a graphics processing unit 1422, a video processing unit 1428 and an audio processing unit 1432. In another implementation, the computing system 1400 may include a chipset (not illustrated), which refers to a group of integrated circuits, or chips, that are designed to work with the processing device 1402 and controls communications between the processing device 1402 and external devices. For example, the chipset may be a set of chips on a motherboard that links the processing device 1402 to very high-speed devices, such as main memory 1404 and graphic controllers, as well as linking the processing device 1402 to lower-speed peripheral buses of peripherals, such as USB, PCI or ISA buses.

The data storage device 1416 may include a computer-readable storage medium 1424 on which is stored software 1426 embodying any one or more of the methodologies of functions described herein. The software 1426 may also reside, completely or at least partially, within the main memory 1404 as instructions 1426 and/or within the processing device 1402 as processing logic during execution thereof by the computing system 1400; the main memory 1404 and the processing device 1402 also constituting computer-readable storage media.

The computer-readable storage medium 1424 may also be used to store instructions 1426 utilizing the processing device 1402, and/or a software library containing methods that call the above applications. While the computer-readable storage medium 1424 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is processor comprising: a translation lookaside buffer (TLB) to store a TLB entry, wherein the TLB entry comprises a first set of valid bits to identify if the first TLB entry corresponds to a virtual address from a memory access request, wherein the valid bits are set based on a first page size associated with the TLB entry from a first set of different page sizes assigned to a first probe group; and a control circuit to probe the TLB for each page size of the first set of different page sizes assigned to the first probe group in a single probe cycle to determine if the TLB entry corresponds to the virtual address from the memory access request.

In Example 2, the subject matter of Example 1, wherein the control circuit comprises logic to compare a virtual page number from the virtual address to a virtual tag of the TLB entry and to determine whether one of the bits of a set of valid bits indicates that the TLB entry corresponds to the virtual address.

In Example 3, the subject matter of any one of Examples 1-2, wherein if the TLB entry corresponds to the virtual address from the memory request, the control circuit is to generate a physical address from a physical page number of the TLB entry and an offset of the virtual address.

In Example 4, the subject matter of any one of Examples 1-3, wherein generating the physical address comprises adding the lowest bits of the physical page number with a valid bit number from the virtual address to obtain a root address of a physical page and appending the offset of the virtual address to the root address.

In Example 5, the subject matter of any one of Examples 1-4, wherein the TLB further comprises a reconfigurable sub-TLB, wherein the reconfigurable sub-TLB is to store the TLB entry.

In Example 6, the subject matter of any one of Examples 1-5, further comprising: a configuration register to store a configuration of the TLB, the configuration identifying a page size assigned to the sub-TLB from a plurality of page sizes supported by the sub-TLB.

In Example 7, the subject matter of any one of Examples 1-6, wherein the TLB further comprises a second sub-TLB to store a second TLB entry, and wherein the configuration identifies a page size assigned to the second sub-TLB from a plurality of page sizes supported by the second sub-TLB.

Various implementations may have different combinations of the structural features described above. For instance, all optional features of the processors and methods described above may also be implemented with respect to a system described herein and specifics in the examples may be used anywhere in one or more implementations.

Example 8 is a system comprising: a memory device; and a processor coupled to the memory device, wherein the processor comprises: a translation lookaside buffer (TLB) to store a first TLB entry and a second TLB entry wherein the first TLB entry comprises a first set of valid bits to identify a first page size associated with the first TLB entry from a first set of different page sizes assigned to a first probe group, and wherein the second TLB entry comprises a second set of valid bits to identify a second page size associated with the second TLB entry from the first set of different page sizes assigned to the first probe group, wherein the TLB comprises: a reconfigurable sub-TLB to store the first TLB entry and the second TLB entry; and a logic circuit to receive a virtual address from a memory access request, and probe the TLB to determine if the first or second TLB entries correspond to the virtual address; and a configuration register to store a configuration of the TLB, the configuration to indicate an assignment of the first probe group to the reconfigurable sub-TLB from a plurality of probe groups supported by the reconfigurable sub-TLB.

In Example 9, the subject matter of Example 8, wherein the first and second TLB entries further comprise a virtual tag, a size tag, and a physical page number.

In Example 10, the subject matter of any one of Examples 8-9, wherein the logic circuit comprises logic to compare a virtual page number from the virtual address to a virtual tag of a TLB entry and to determine whether one of the bits of a set of valid bits indicates that the TLB entry corresponds to the virtual address.

In Example 11, the subject matter of any one of Examples 8-10, wherein the TLB further comprises a second sub-TLB to store a third TLB entry, and wherein the configuration of the TLB identifies a second probe group assigned to the second sub-TLB from the plurality of probe groups.

In Example 12, the subject matter of any one of Examples 8-11, wherein if the first TLB entry corresponds to the virtual address from the memory access request, the logic circuit is to generate a physical address from a physical page number of the first TLB entry and an offset of the virtual address.

In Example 13, the subject matter of any one of Examples 8-12, wherein generating the physical address comprises adding the lowest bits of the physical page number with a valid bit number from the virtual address to obtain a root address of a physical page and appending the offset of the virtual address to the root address.

Various implementations may have different combinations of the structural features described above. For instance, all optional features of the processors and methods described above may also be implemented with respect to a system described herein and specifics in the examples may be used anywhere in one or more implementations.

Example 14 is a method comprising: receiving a memory access request comprising a virtual address; selecting a first probe group from a plurality of probe groups, wherein the first probe group comprises a plurality of page sizes; applying a first hash function associated with the first probe group to the virtual address to select a set of TLB entries; and probing the set of TLB entries to determine if a TLB entry corresponds to the virtual address and the first probe group.

In Example 15, the subject matter of Example 14, wherein the probing further comprises: determining if a virtual page number of the virtual address matches a virtual tag of a TLB entry for a specified page size in the first probe group; determining if a valid bit of a plurality of valid bits is set as valid; and determine if a size tag of the TLB entry corresponds to the first probe group.

In Example 16, the subject matter of any one of Examples 14-15, further comprising: in response to determining that a TLB entry corresponding to the virtual address and the probe group, generating a physical address from a physical page number of the TLB entry and an offset from the virtual address.

In Example 17, the subject matter of any one of Examples 14-16, further comprising: in response to determining that no TLB entry corresponds to the virtual address, retrieving from a page table a virtual to physical mapping for the virtual address; and creating a TLB entry comprising the virtual to physical mapping and a plurality of valid bits.

In Example 18, the subject matter of any one of Examples 14-17, wherein creating a TLB entry comprises setting one or more bits of the plurality of valid bits of the TLB entry according to the page size of a page to which the TLB entry maps.

In Example 19, the subject matter of any one of Examples 14-18, wherein determining if a valid bit of a plurality of valid bits comprises selecting a valid bit to check using a value derived from the virtual address.

In Example 20, the subject matter of any one of Examples 14-19, wherein generating the physical address further comprises: adding a valid bit number to a subset of bits of a physical page number to obtain a result, wherein the valid bit number and the subset of bits of the physical page number comprise the same number of bits; and concatenating the result with the offset from the virtual address.

Various implementations may have different combinations of the structural features described above. For instance, all optional features of the processors and methods described above may also be implemented with respect to a system described herein and specifics in the examples may be used anywhere in one or more implementations.

Example 21 is a system comprising means to perform a method of any one of the Examples 14-20.

Example 22 is at least one non-transitory machine readable storage medium comprising a plurality of instructions, when executed, to implement a method or realize an apparatus of any one of Examples 14-20.

Example 23 is an apparatus comprising a processor configured to perform the method of any one of Examples 14-20.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' 'capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
  a translation lookaside buffer (TLB) to store a TLB entry, wherein the TLB entry comprises a first set of valid bits and a first set of size bits to identify if the TLB entry corresponds to a virtual address from a memory access request, wherein the valid bits are set based on a first page size associated with the TLB entry from a first set of different page sizes assigned to a first probe group of a plurality of probe groups, each probe group comprising a plurality of page sizes, each page size being unique across the probe groups, and wherein the size bits are set based on the probe group associated with the TLB entry; and
  a control circuit to probe the TLB for each page size of the first set of different page sizes assigned to the first probe group and to check for the first set of size bits corresponding to the first probe group in a single probe cycle to determine if the TLB entry corresponds to the virtual address from the memory access request and the first probe group, wherein upon a determination that no TLB entries correspond to the virtual address from the memory access request and the first probe group, the control circuit is further to probe the TLB for each page size assigned to a second probe group in a next probe cycle.

2. The processor of claim 1, wherein the control circuit comprises logic to compare a virtual page number from the virtual address to a virtual tag of the TLB entry and to determine whether a valid bit of a set of valid bits indicates that the TLB entry corresponds to the virtual address.

3. The processor of claim 1, wherein if the TLB entry corresponds to the virtual address from the memory request, the control circuit is to generate a physical address from a physical page number of the TLB entry and an offset of the virtual address.

4. The processor of claim 3, wherein generating the physical address comprises adding the lowest bits of the physical page number with a valid bit number from the virtual address to obtain a root address of a physical page and appending the offset of the virtual address to the root address.

5. The processor of claim 1, wherein the TLB further comprises a reconfigurable sub-TLB, wherein the reconfigurable sub-TLB is to store the TLB entry.

6. The processor of claim 5, further comprising:
  a configuration register to store a configuration of the TLB, the configuration identifying a page size assigned to the sub-TLB from a plurality of page sizes supported by the sub-TLB.

7. The processor of claim 6, wherein the TLB further comprises a second sub-TLB to store a second TLB entry, and wherein the configuration identifies a page size assigned to the second sub-TLB from a plurality of page sizes supported by the second sub-TLB.

8. A system comprising:
  a memory device; and
  a processor coupled to the memory device, wherein the processor comprises:
    a translation lookaside buffer (TLB) to store a first TLB entry and a second TLB entry wherein the first TLB entry comprises a first set of valid bits to identify a first page size associated with the first TLB entry from a first set of different page sizes assigned to a first probe group, and wherein the second TLB entry comprises a second set of valid bits to identify a second page size associated with the second TLB entry from the first set of different page sizes assigned to the first probe group, each of the first and second TLB entries further comprises a set of size bits to identify the first probe group from a plurality of different probe groups, wherein the TLB comprises:
      a reconfigurable sub-TLB to store the first TLB entry and the second TLB entry; and
      a logic circuit to receive a virtual address from a memory access request, and probe the TLB to determine if the first or second TLB entries correspond to the virtual address; and
    a configuration register to store a configuration of the TLB, the configuration to indicate an assignment of the first probe group to the reconfigurable sub-TLB from a plurality of probe groups supported by the reconfigurable sub-TLB.

9. The system of claim 8, wherein the first and second TLB entries further comprise a virtual tag, a size tag, and a physical page number.

10. The system of claim 8, wherein the logic circuit comprises logic to compare a virtual page number from the virtual address to a virtual tag of a TLB entry and to determine whether a bit of a set of valid bits indicates that the TLB entry corresponds to the virtual address.

11. The system of claim 8, wherein the TLB further comprises a second sub-TLB to store a third TLB entry, and wherein the configuration of the TLB identifies a second probe group assigned to the second sub-TLB from the plurality of probe groups.

12. The system of claim 8, wherein if the first TLB entry corresponds to the virtual address from the memory access request, the logic circuit is to generate a physical address from a physical page number of the first TLB entry and an offset of the virtual address.

13. The system of claim 12, wherein generating the physical address comprises adding the lowest bits of the physical page number with a valid bit number from the virtual address to obtain a root address of a physical page and appending the offset of the virtual address to the root address.

14. A method comprising:
    receiving a memory access request comprising a virtual address;
    selecting a first probe group from a plurality of probe groups, each probe group comprising a plurality of page sizes, each page size being unique across the plurality of probe groups;
    associating each probe group with a respective hash function corresponding to a largest page size in that probe group;
    applying a first hash function associated with the first probe group to the virtual address to select a set of TLB entries and probing the set of TLB entries to determine if a TLB entry corresponds to the virtual address and the first probe group in a single probe cycle; and
    responsive to determining that no TLB entry corresponds to the virtual address and the first group, applying a second hash function associated with a second probe group to the virtual address to select a second set of TLB entries and probing the second set of TLB entries to determine if a TLB entry corresponds to the virtual address and the second probe group in the next probe cycle.

15. The method of claim 14, wherein the probing further comprises:
    determining if a virtual page number of the virtual address matches a virtual tag of a TLB entry for a specified page size in the first probe group;
    determining if a valid bit of a plurality of valid bits is set as valid; and
    determining if a size tag of the TLB entry corresponds to the first probe group.

16. The method of claim 15, wherein determining if a valid bit of a plurality of valid bits comprises selecting a valid bit to check using a value derived from the virtual address.

17. The method of claim 14, further comprising:
    in response to determining that a TLB entry corresponding to the virtual address and the first probe group, generating a physical address from a physical page number of the TLB entry and an offset from the virtual address.

18. The method of claim 17, wherein generating the physical address further comprises:
    adding a valid bit number to a subset of bits of a physical page number to obtain a result, wherein the valid bit number and the subset of bits of the physical page number comprise the same number of bits; and
    concatenating the result with an offset from the virtual address.

19. The method of claim 14, further comprising:
    in response to determining that no TLB entry corresponds to the virtual address, retrieving from a page table a virtual to physical mapping for the virtual address; and
    creating a TLB entry comprising the virtual to physical mapping and a plurality of valid bits.

20. The method of claim 19, wherein creating the TLB entry comprises setting one or more bits of the plurality of valid bits of the TLB entry according to the size of a page to which the TLB entry maps.

* * * * *